United States Patent [19]

Nehab et al.

[11] Patent Number: 6,029,182
[45] Date of Patent: Feb. 22, 2000

[54] SYSTEM FOR GENERATING A CUSTOM FORMATTED HYPERTEXT DOCUMENT BY USING A PERSONAL PROFILE TO RETRIEVE HIERARCHICAL DOCUMENTS

[75] Inventors: Smadar Nehab, Palo Alto; Manjula G. Wickramaratne, Fremont; Paul L. Klark, Mountain View, all of Calif.

[73] Assignee: Canon Information Systems, Inc., Irvine, Calif.

[21] Appl. No.: 08/726,853

[22] Filed: Oct. 4, 1996

[51] Int. Cl.[7] .................................................. G06F 17/30
[52] U.S. Cl. ............................................. 707/523; 707/501
[58] Field of Search ..................................... 707/523, 501; 345/349

[56] References Cited

U.S. PATENT DOCUMENTS

| | | | |
|---|---|---|---|
| 4,959,769 | 9/1990 | Cooper et al. | 707/200 |
| 4,965,763 | 10/1990 | Zamora | 704/1 |
| 5,181,162 | 1/1993 | Smith et al. | 707/530 |
| 5,267,155 | 11/1993 | Buchanan et al. | 707/540 |
| 5,327,554 | 7/1994 | Palazzi, III et al. | 348/13 |
| 5,347,632 | 9/1994 | Filepp et al. | 395/200.32 |
| 5,392,428 | 2/1995 | Robins | 707/3 |
| 5,408,655 | 4/1995 | Oren et al. | 707/501 |
| 5,423,043 | 6/1995 | Fitzpatrick et al. | 345/351 |
| 5,530,852 | 6/1996 | Meske, Jr. et al. | 395/200.36 |
| 5,649,186 | 7/1997 | Ferguson | 707/533 |
| 5,737,560 | 4/1998 | Yohanan | 345/349 |
| 5,754,939 | 5/1998 | Hertz et al. | 395/200.49 |
| 5,758,361 | 5/1998 | Van Hoff | 707/513 |
| 5,761,662 | 6/1998 | Dasan | 707/10 |
| 5,764,906 | 6/1998 | Edelstein et al. | 395/200.49 |
| 5,877,766 | 3/1999 | Bates et al. | 345/357 |
| 5,886,683 | 3/1999 | Tognazzini et al. | 345/146 |
| 5,890,152 | 3/1999 | Rapaport et al. | 707/6 |

OTHER PUBLICATIONS

Collins, Regina S., ed., "Journalist(TM): Your Personal Newspaper for Compuserve(R)", Cupertino, Ca.: PED Software Corporation, pp. 1–143, Jan. 1993.

Advertisement by the San Jose Mercury, "Newshound User Guide", no date available.

Adverstisement by Dow Jones and Company, "News Retrieval for Windows", no date available.

Beretta, Giordano, "W³+Structure=Knowledge", Hewlett Packard Laboratories Technical Report HPL–96–99, Jun., 1996.

Online User, "Personal Journal—Daily News on Your Virtual Doorstep", pp. 50–54, Oct./Nov. 1995.

At www.e.g.bucknell.edu/boulter/crayon "Crayon—Create Your Own Newspaper", Jun. 26, 1995.

*Primary Examiner*—Mark R. Powell
*Assistant Examiner*—J. A. Rossi
*Attorney, Agent, or Firm*—Fitzpatrick, Cella, Harper & Scinto

[57] ABSTRACT

A World Wide Web site data retrieval system includes an input device for inputting data and commands to access the World Wide Web, and a memory for storing a Web site data retrieval driver which includes a Web reader, stored Web site address information, stored Web site commands, and stored format information. The memory also stores process steps to connect to a Web site and to issue commands within the connected Web site, and a connection to the World Wide Web. The system includes a processor for launching the Web site data retrieval driver in response to a command to access the World Wide Web. The Web site retrieval driver, upon being launched, (1) launches the Web reader to connect to the World Wide Web via the connection, (2) retrieves the Web site address information and Web site commands, (3) instructs the Web reader to access the Web site based on the Web site address information and Web site commands, (4) downloads Web site data from the Web site based on the Web site commands, (5) stores the Web site data in a linear document, (6) repeats steps 1 through 5 until all addresses in the stored Web site address information have been accessed, and (7) formats the linear document into a personalized document based on the format information.

21 Claims, 16 Drawing Sheets

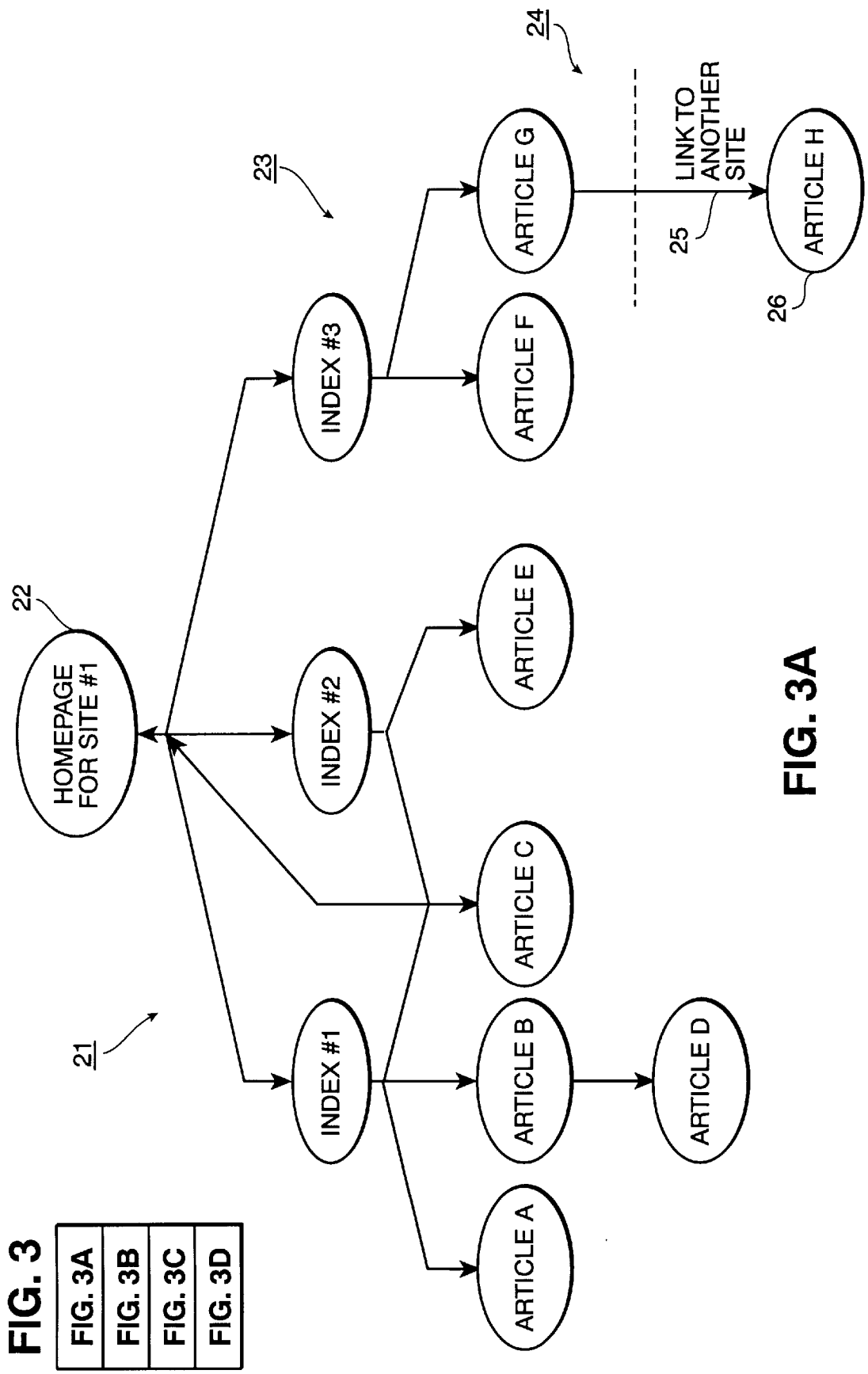

SYSTEM FOR GENERATING A CUSTOM FORMATTED HYPERTEXT DOCUMENT BY USING A PERSONAL PROFILE TO RETRIEVE HIERARCHICAL DOCUMENTS

BACKGROUND OF THE INVENTION

1. Field of the Invention

The invention relates to a data retrieval system which automatically traverses hypermedia documents on a computer network and automatically retrieves information from those documents based on a match between the structure of the documents and a personalized data retrieval structure. More particularly, the invention can retrieve articles from a news service, from a magazine service, or from a combination of both services which are located on the World Wide Web, a private computer network that supports hypermedia links, or any other hypermedia-linked computer system.

For example, there exists a Web site for retrieving news articles from the New York Times and a Web site for retrieving articles from People magazine. The retrieval system of the invention can traverse through such Web sites and select articles based on a personalized data retrieval structure. The personalized data retrieval structure may include commands to retrieve a full text of the front page only, headlines of the business section, headlines of the stock section and sports section, etc. In addition, the personalized data retrieval structure may include content-based rules to retrieve articles with certain keywords, to exclude articles with certain keywords, or to include articles based on a rule-based content analysis. The invention also provides a method for synthesizing all retrieved news articles and printing the synthesized news articles into a newspaper-type format in which each of the articles is arranged based on a user's predefined layout.

While the above example is in the context of the Web, hypermedia documents can reside on other types of networks besides the Web, such as an intranet. An intranet is a private computer network that is not connected to outside computer networks. For example, a company's own computer network could be an intranet with hypermedia documents on it. For brevity, the following discussion is made with respect to the World Wide Web. However, it should be understood that the invention applies equally well to any type of computer network that contains hypermedia documents, such as an intranet, different hypermedia-linked computer networks that reside on the Internet other than the Web, etc.

A hypermedia document on the Web can span multiple Web sites. Such documents can be newspapers, news articles, magazines, catalogs, manuals, memoranda, and the like. For brevity, the following discussion is made with respect to sources of news information. However, it should be understood that the invention applies equally well to any other type of hypermedia document.

2. Description of the Related Art

The World Wide Web is an on-line source of hypermedia documents containing hypermedia text and images that act as links to other documents, Web sites, etc. As a result, documents on the Web are not organized sequentially. Rather, a user is automatically linked to other documents or Web sites to complete the viewing of a document by selecting a hypermedia link, such as a text link or an image link, within the document. Accordingly, an entire document cannot be viewed by scrolling through text.

One popular use of the Web is on-line publication and distribution of magazines and newspapers. Currently, many Web news services, such as the New York Times, allow the user to define keywords of interest and to receive news information, daily or hourly, that contains text matching the keywords. The news information can then be delivered to the user's computer via modem or E-mail. However, most Web news site newspapers, like the New York Times, include too much information, most of which has no interest to the user since the information is retrieved based only on a keyword match.

Other sources of news information are provided through information suppliers like "Individual Inc." Individual Inc. supplies users with a brief summary of the top twenty most relevant articles based on a user's predefined keywords. This subscription news service allows the user to specify five to ten areas of interest based on keywords, which are then prioritized by the user. The information service searches the Web for magazines and newspapers which contain any of the keywords. Based on the keyword searches, twenty of the most relevant articles are selected, compiled into a brief one-page summary, and transmitted to the user via facsimile for the user's review. However, in order to review an entire document rather than the summary, the user must log onto a specific Web site containing the document in order to retrieve and review the document.

There are yet other services which permit the user to personalize a newspaper to be displayed at the user's terminal by storing links to various news articles from various news sources on the Web. For example, CRAYON "Create Your Own Newspaper" permits a user to select specific sections from among links to over twenty-five different on-line newspapers, and to compose the selections into a personalized newspaper. Using CRAYON, it is possible to compose a personalized newspaper containing, for example, links to the international section of the New York Times, the business section of the Wall Street Journal, and the sports section of the Chicago Tribune. The HTML (hypertext markup language) source file for this newspaper is then stored to mass media storage for later use.

While the forgoing news and information services provide convenient ways to keep updated on the news, they do not allow a user to access and view the news in the way that people naturally read a real-world newspaper. Namely, people naturally read a newspaper by scanning the pages of sections that they find interesting and then reading those articles that grab their attention. In other words, people use a structural approach to decide what pages to look at initially (e.g., the first page of the Business and World sections, and the comics page of the Arts section). They then scan the selected pages for articles.

In sum, conventional news and information services do not allow a user to access data from a hypermedia document on the basis of the structure of the document, and then to format that data in a manner that allows the user to scan and read the data in a natural fashion.

SUMMARY OF THE INVENTION

The invention addresses the above deficiencies in the art by accessing at least one hypermedia document, retrieving data from the hypermedia document into an extracted data tree, with the data retrieved based on a structure of the hypermedia document, flattening the extracted data tree into a linear document, and formatting the linear document into a formatted document.

In another aspect, the invention creates a personal-news-profile for retrieving data from a hypermedia-linked computer network. The hypermedia-linked computer network is accessed, a learning mode is started, the hypermedia-linked computer network is traversed with commands, at least one rule is extracted from the commands, and the rule(s) is compiled into the personal-news-profile.

In yet another aspect, the invention creates a personalization profile for a Web site retrieval data retrieval system. Data and commands are input to access the World Wide Web and a connection is made to the World Wide Web. A Web reader is launched, and the Web reader accesses the Web via the connection. In response to user commands, a learning mode is entered into. Commands are sent to traverse the World Wide Web, and at least one rule is extracted from the commands. The rule(s) is compiled into a personalization profile, which is stored.

In yet another aspect, the invention retrieves articles from a hypermedia-linked computer network and formats the articles into a personalized newspaper. A stored personal-news-profile is retrieved. The personal-news-profile includes address data for a site on the hypermedia-linked computer network, command data for accessing data from the site, and newspaper layout commands. The site is accessed based on address data stored in the personal-news-profile, and articles at the site are downloaded based on command data stored in the personal-news-profile. The downloaded articles are flattened into a linear document, and the linear document is formatted into the personalized newspaper according to newspaper layout commands stored in the personal-news-profile.

In yet another aspect, the invention retrieves data from a World Wide Web site and formats the data into a personalized document. A Web site data retrieval driver which includes a Web reader, stored Web site address information, stored Web site commands, and stored format information is accessed. The invention (1) launches the Web reader to connect to the World Wide Web via a connection to the Web, (2) retrieves the Web site address information and Web site commands, (3) instructs the Web reader to access the Web site based on the Web site address information and Web site commands, (4) downloads Web site data from the Web site based on the Web site commands, wherein the data is downloaded with reference to a linked list so as to avoid hypermedia-links that form loops and so as to avoid repetitious downloading of data that has already been downloaded, (5) stores the Web site data in a linear document, (6) repeats steps 2 through 5 until all addresses in the stored Web site address information have been accessed, and (7) formats the linear document into the personalized document based on the format information.

In yet another aspect, the invention accesses and retrieves data at World Wide Web sites and formats the data into a personalized document. The invention connects to the World Wide Web, retrieves user defined Web site address information, user defined Web site commands, and user defined formatting commands, and activates a Web reader so as to access a Web site based on the user defined Web site address information. The Web reader is used to download data from the Web based on the user defined Web site commands, and the data is downloaded into an extracted data tree. The downloading continues until all addresses in the user defined Web site address information have been accessed. The extracted data tree is flattened into a linear document, and the flattened document is formatted into the personalized document based on the user defined formatting commands.

In yet another aspect, the invention retrieves news articles from on-line news services on the World Wide Web and formats the news articles into a personalized newspaper. The invention stores a personal-news-profile which comprises addresses data and command data for accessing data from a Web site and newspaper format commands, retrieves the stored personal-news-profile and accesses the data stored therein, activates a Web reader to contact a Web site based on address data stored in the personal-news-profile, downloads news articles at the contacted Web site based on command data stored in the personal-news-profile, stores the downloaded news articles, and formats the stored news articles into the personalized newspaper based on the newspaper format commands stored in the personal-news-profile.

In yet another aspect, the invention formats a hypermedia document into a personalized document. A location of the hypermedia document is specified, a type of the hypermedia document is specified, a scope of data to be retrieved from the hypermedia document is specified, wherein the scope is based on a structure of the hypermedia document, and a format is specified for formatting the data retrieved from the hypermedia document into the personalized document. The hypermedia document found at the specified location is accessed, data is retrieved from the hypermedia document in accordance with the specified hypermedia document type and in accordance with the specified scope, and the data is formatted into the personalized document in accordance with the specified format.

In yet another aspect, the invention is a system for processing a hypermedia document. The system accesses the hypermedia document, extracts addresses from the hypermedia document, and stores the addresses extracted from the hypermedia document in a container. The system activates a processing function to process data stored at the addresses stored in the container, downloads the data stored at the addresses stored in the container into a memory, and extracts predetermined data from downloaded data in accordance with predetermined configuration information. The predetermined data is then formatted in accordance with pre-defined formatting settings to generate a formatted document, and the formatted document is processed in accordance with the processing function.

In preferred embodiments, the system inputs the formatting settings and configuration information via a graphical user interface. The graphical user interface comprises plural processing icons, one of which activates the processing function. By virtue of the graphical user interface, a user can interactively set a document's format and change that format should a change be desired.

In particularly preferred embodiments, the graphical user interface is displayed in plural modes. The plural modes comprise (1) a fully-functional mode in which the graphical user interface displays formatting fields, processing options, menus and the processing icons, and (2) a minimizing mode in which the graphical user interface displays only the processing icons. Typically, the graphical user interface displayed in the minimizing mode is displayed during browsing the hypermedia document. By displaying the graphical user interface in plural modes, the present invention facilitates operation of the invention during browsing of the hypermedia document.

This summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENT

Figure 1:
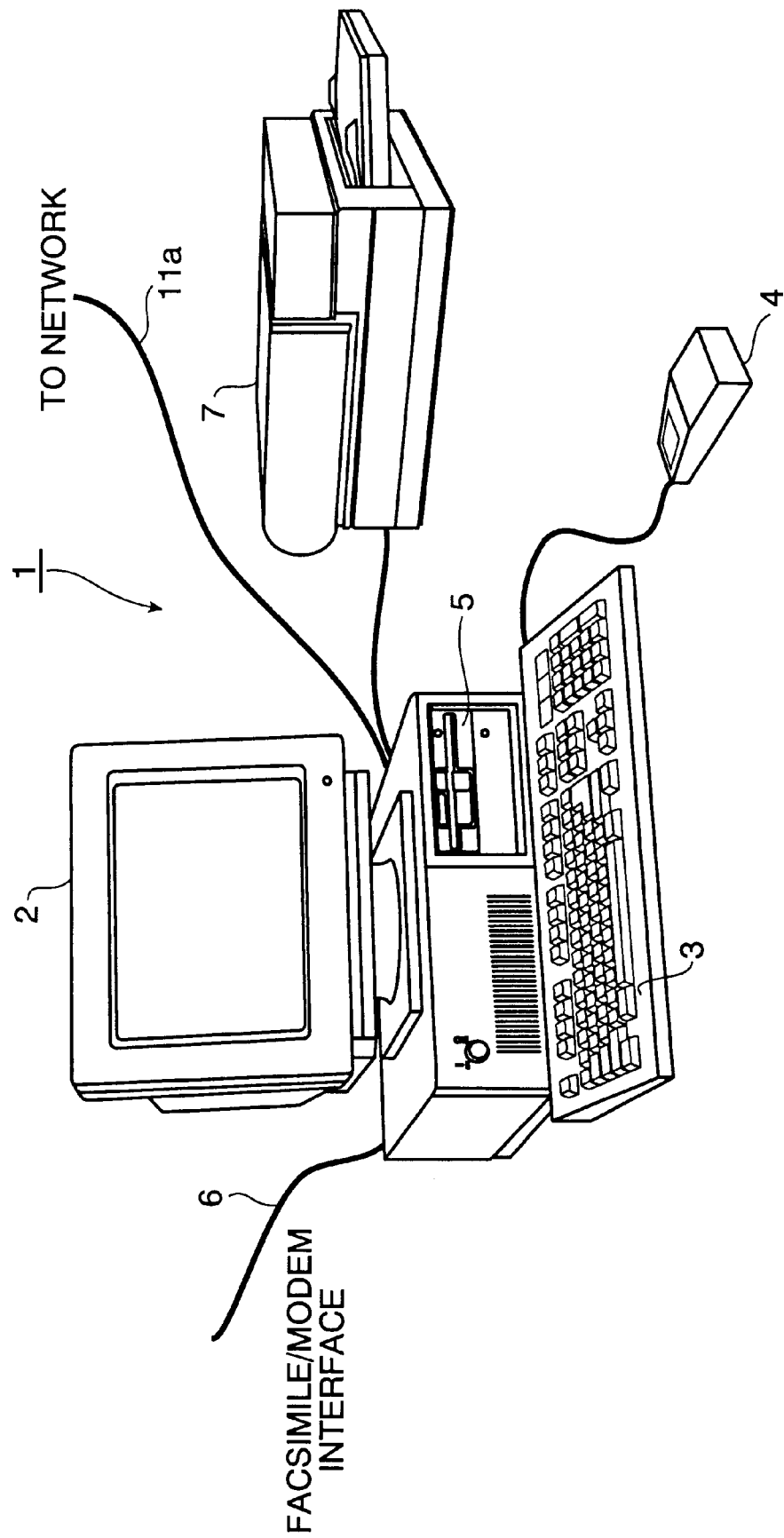
FIG. 1 is a perspective view showing the outward appearance of the personal news retrieval system according to the invention.

FIG. 1 is a view showing the outward appearance of a representative embodiment of the invention. Shown in FIG. 1 is computing equipment 1, such as a MacIntosh or an IBM PC or a PC-compatible computer, having a windowing environment, such as Microsoft Windows. Provided with computing equipment 1 is display screen 2, such as a color monitor or a monochromatic monitor, keyboard 3 for entering text data and user commands, and a pointing device such as mouse 4 for pointing and for manipulating objects displayed on display 2. Computing equipment 1 also includes a mass storage device such as disk drive 5. Image data can be input into computing equipment 1 from a variety of sources such as a network interface 11a or from external devices via facsimile/modem interface 6. Network interface 11a is used to connect computing equipment 1 to a local area network (LAN) or to a wide area network (WAN) such as the World Wide Web.

Figure 2:
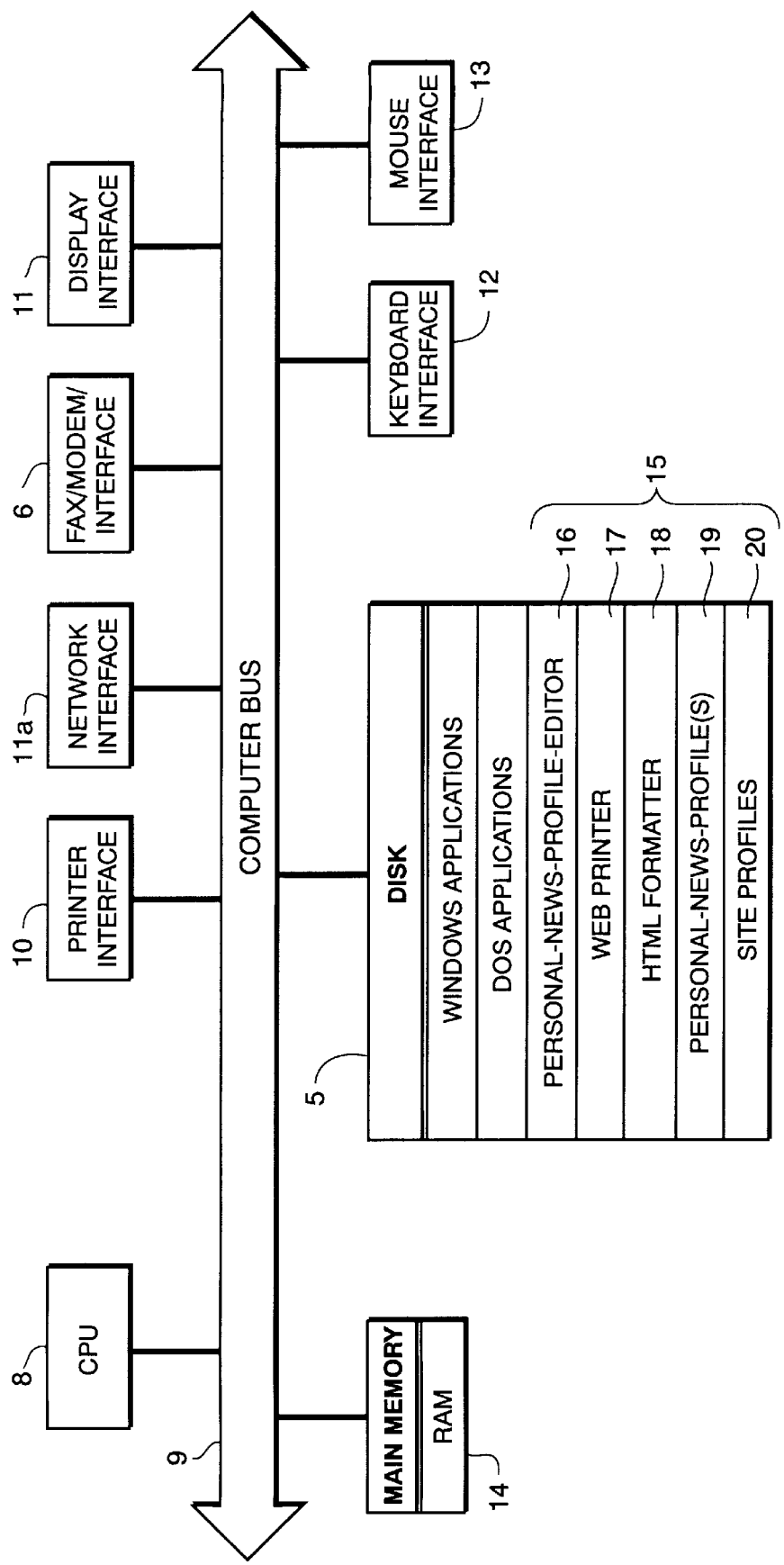
FIG. 2 is a block diagram of the personal news retrieval system shown in FIG. 1.

FIG. 2 is a detailed block diagram showing the internal construction of computing equipment 1. As shown in FIG. 2, computing equipment 1 includes central processing unit (CPU) 8 interfaced with computer bus 9. Also interfaced with computer bus 9 is printer interface 10, fax/modem interface 6, display interface 11, network interface 11a, keyboard interface 12, mouse interface 13, main memory 14, and disk drive 5.

Main memory 14 interfaces with computer bus 9 so as to provide random access memory storage for use by CPU 8 when executing an application such as personal-news-profile editor 16 or Web printer 17. More specifically, CPU 8 loads these software applications from disk drive 5 into main memory 14 and executes the software applications out of main memory 14. In accordance with user instructions, stored application programs are activated which permit processing and manipulation of data. Typically, the software applications stored on disk drive 5, such as personal-news-profile editor 16, Web printer 17, and HTML formatter 18, have been stored on disk drive 5 by downloading the software applications from a computer-readable medium such as a floppy disk or CD ROM, or by downloading the software applications from a computer bulletin board.

Disk drive 5 stores data files which can include text files and image files, in compressed or uncompressed format, and stores software application files such as those noted above. The software application files include Windows applications, DOS application, and personal news retrieval files 15. Personal news retrieval files 15 include personal-news-profile editor 16, Web printer 17, HTML formatter 18, personal-news-profile(s) 19, and site profile(s) 20. The detailed functions of personal news retrieval files 15 will be discussed below, after a brief overview of the operation of the personal new retrieval system.

Overview of Document Retrieval

Figure 3B:
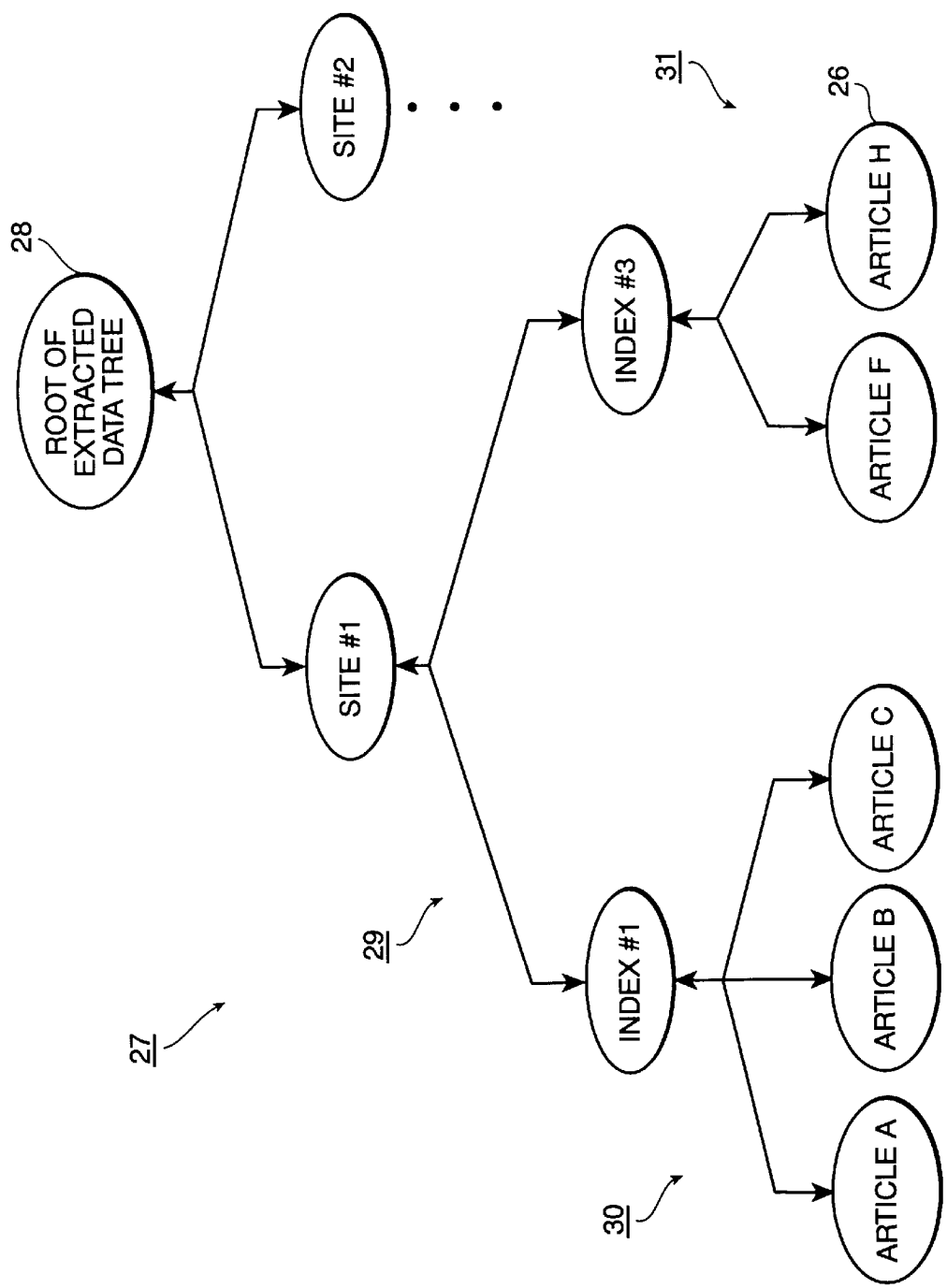
FIG. 3, comprised of FIGS. 3A, 3B, 3C and 3D, shows representational diagrams illustrating an example of the transformation of information from the Web (FIG. 3A) to an extracted data tree (FIG. 3B), then to a flattened document (FIG. 3C), and finally to a formatted document (FIG. 3D) according to the invention.
Figures 3C, 3D:
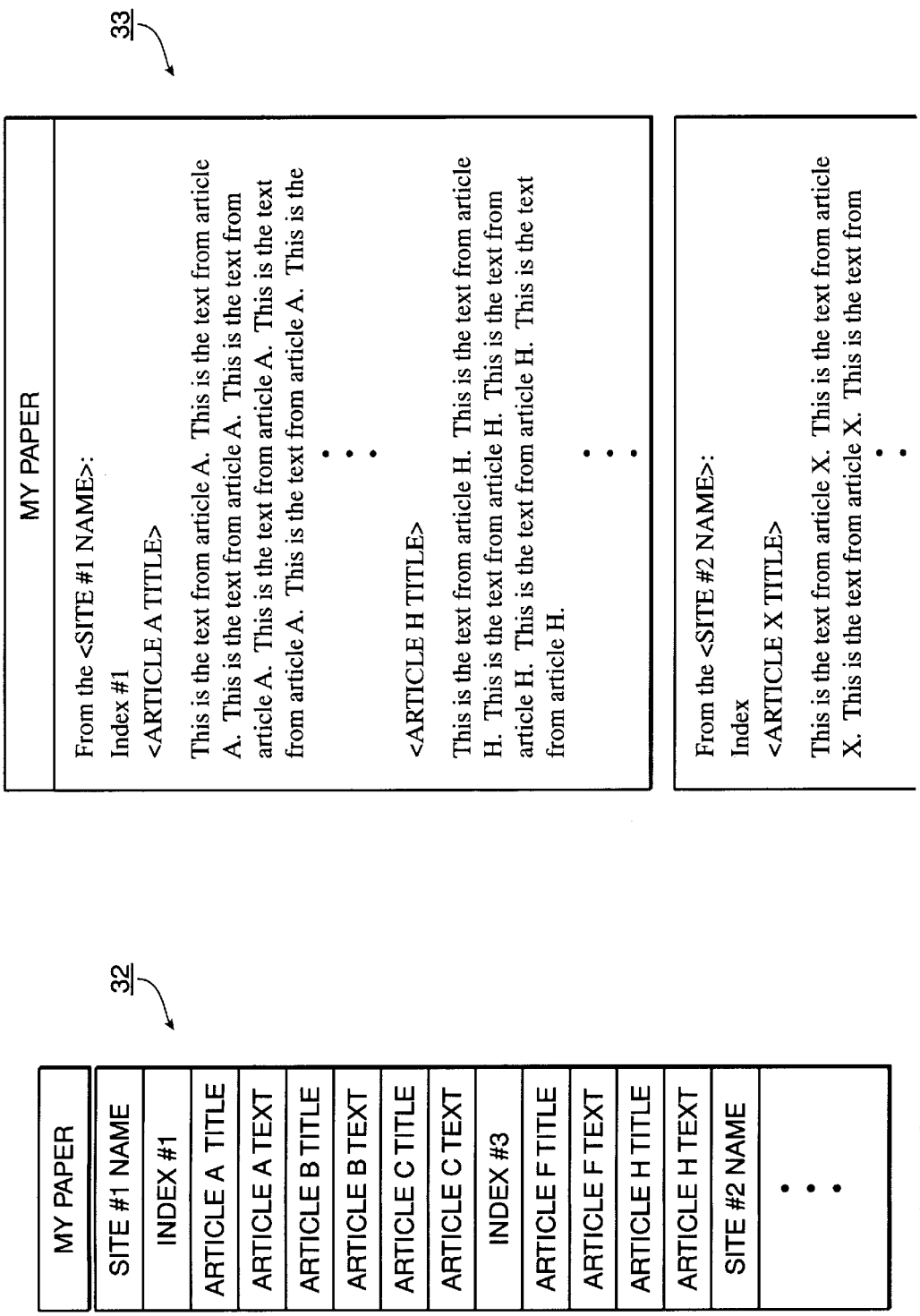

FIG. 3, comprised of FIGS. 3A to 3D, illustrates the operation of a representative embodiment of the invention. FIG. 3A is a graphical representation of a typical Web site 21 with news information contained therein. Within Web site 21 is homepage 22 with links to indices such as headings 23, which are in turn linked to articles 24. Some of articles 24 are linked to other articles. As article H 26 resides on another Web site, link 25 is a cross-site link. Link 25 illustrates how a single hypermedia document, represented by homepage 22, can traverse multiple Web sites.

In order to retrieve news from Web site 21, the invention first traverses Web site 21 to retrieve data according to user-defined rules. As will be discussed in more detail below, these rules can be based on the structure of Web site 21, or on the structure of Web site 21 and its contents. The data is retrieved into an extracted data tree, which preserves the organization of the data as shown in FIG. 3B, but in which some links are excluded.

The organization of extracted data tree 27 has several features. First, extracted data tree 27 has root 28 which can have child nodes for one or more sites 29, which in turn can have index nodes 30 which correspond to indices/headings 23, articles nodes 31, and the like. Second, extracted data tree 27 is a true tree, with no loops (i.e., cyclic paths) therein. For example, FIG. 3A shows a loop from homepage 22 to index node #1, to article C, and then back to homepage 22. This loop is removed when creating extracted data tree 27.

Second, the organization of extracted data tree 27 depends on how the Web sites are traversed, and not on the Web sites' actual layouts. Thus, article H 26 appears under index node #3 (under site #1), indicating that the news retrieval system accessed article H 26 from site #1 via cross-site link 25.

Finally, as noted earlier, certain articles have been excluded from extracted data tree 27 due to the structure of Web site 21 or possibly a content of indices/headings 23 and articles 24. For example, articles E and G have been excluded from extracted data tree 27.

According to the invention, extracted data tree 27 is flattened into linear document 32, as shown in FIG. 3C, possibly with reference to more exclusion rules. Linear document 32 is simply a continuous document with information from extracted data tree 27 embedded therein.

Finally, linear document 32 is formatted according to user-specified (or default) formatting instructions into formatted document 33, shown as a stylized personal newspaper in FIG. 3D. Formatted document 33 has various fonts and/or colors for site labels, indices/headings, articles, and the like. Furthermore, formatted document 33 is broken down into pages.

Note that in alternate embodiments of the news retrieval system, certain stages of the above transformation from Web site 21 to formatted document 33 can be skipped. For example, data from Web site 21 can be retrieved directly into flattened document 32, as long as a record of the organization of the data is maintained (possibly in a separate linked list) so as to avoid downloading the same article twice and so as to avoid loops in the organization of Web site 21. Alternatively, extracted data tree 27 can be directly formatted into formatted document 33. In any case, the basic operation of the invention remains the same: the news retrieval system traverses a hypermedia document on the Web, extracts data according to user-defined information, and formats the data into a personalized newspaper.

As mentioned in the above discussion, various user-defined rules and other information (such as formatting information) are involved in the news retrieval process. That user defined information is stored in personal-news-profile(s) 19, the definition of which is described next.

Defining a Personal-News-Profile

Figure 4:
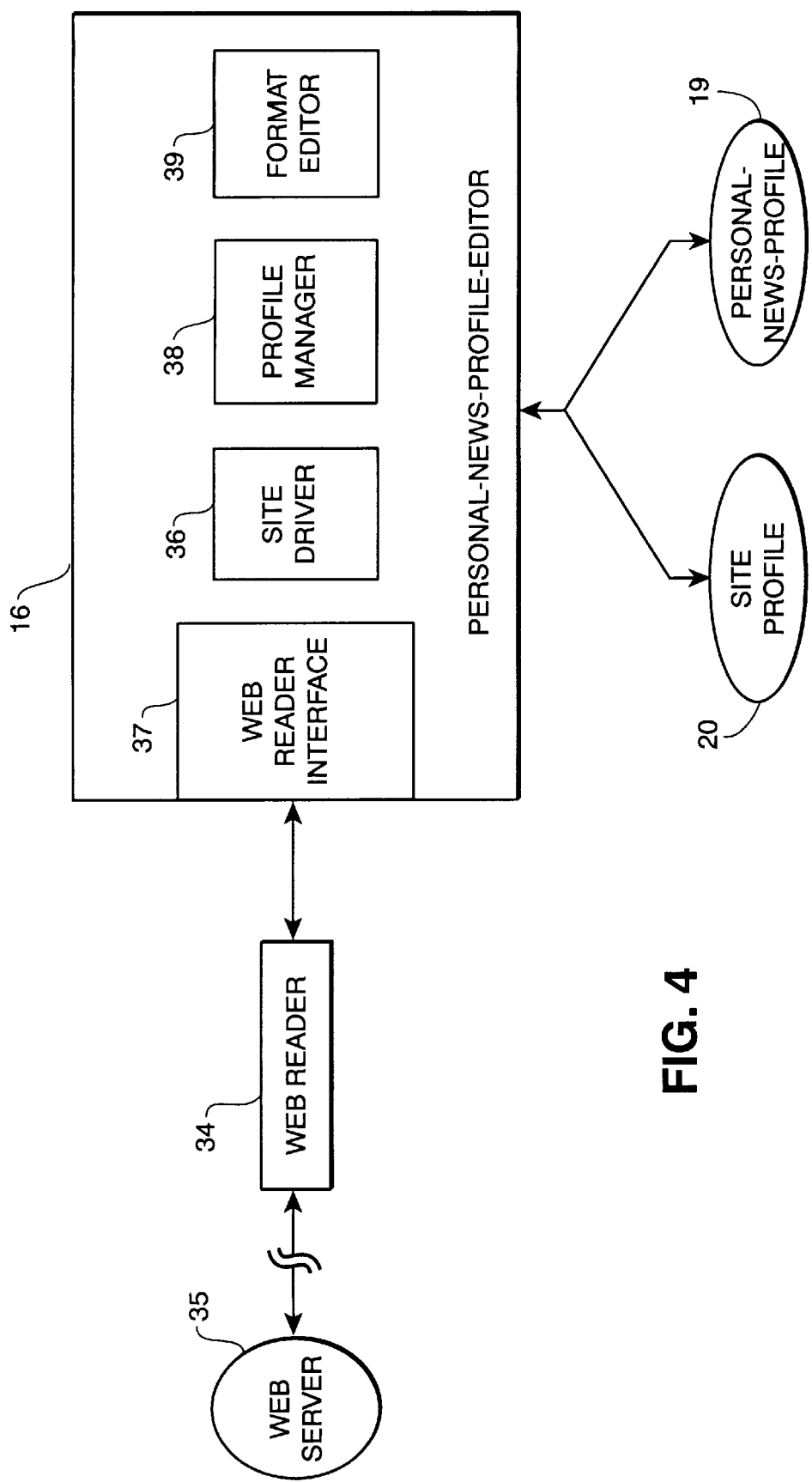
FIG. 4 is a representational block diagram of the manner by which a personal-news-profile for retrieving news articles via the Web is created or edited according to the invention.

FIGS. 4 and 5 illustrate the process by which personal-news-profile 19 is defined. To create personal-news-profile 19, personal-news-profile editor 16 communicates with personal-news-profile 19, site profile 20, and Web reader 34.

Personal-news-profile 19 contains information as to what sites to access for creating a personalized newspaper, what sections to retrieve from those sites, rules to be used to determine what data to extract from the sections and the articles therein, rules to determine how to exclude links, and newspaper format information. A sample personal-news-profile is shown in Appendix 1.

Site profile 20 includes general site information that is not specific to a particular user. For example, site profile 20 could contain information such as full site addresses, sections within a site, non-user specific passwords, etc. Sample site profiles are shown in Appendix 1. Because general site information is stored in site profile 20, personal-news-profile 19 can refer to the general site information with reference to site profile 20, saving space in the personal-news-profile. For example, as shown in Appendix 1, personal-news-profile 19 can refer to a site number 1. Site profile 20 indicates that site number 1 is the "San Jose Mercury News," with a homepage at "http//www.sjmercury.com/". This construction also centralizes general site information. Thus, if a site address changes, only site profile 20 needs to be changed to update all personal-news-profiles 19 on the system.

Web reader 34 is an application program or program module that communicates with the Web via Web server 35. In response to commands from personal-news-profile editor 16, Web reader 34 will access the Web, traverse hypermedia documents on the Web, retrieve data from the documents, and return the retrieved data to personal-news-profile editor 16.

As shown in FIG. 4, personal-news-profile editor 16 includes four modules: site driver 36, Web reader interface 37, profile manager 38, and format editor 39.

Web reader interface 37 interfaces personal-news-profile editor 16 to Web reader 34. Site driver 36 interacts with Web reader 34 via Web reader interface 37 to provide an abstract interface to each individual Web site. More specifically, site driver 36 instructs Web reader 34 to access various Web sites and to retrieve data from those sites. Thereafter, site driver 36 receives that data and builds site profile 20 therefrom. The data can also be used to update an existing site profile.

In building site profile 20, site driver 36 translates the structure of each accessed Web site to a uniform structure defined in site profile 20, and stores data retrieved therefrom in site profile 20. By translating different Web sites, some of which may have different structures, into a single uniform structure and storing data therefrom in that structure in site profile 20, the present invention facilitates access to information from different Web sites, and thus reduces overall processing time.

Profile manager 38 maintains document templates that specify how to format a personalized newspaper. Predefined document templates exist. In addition, format editor 39 allows a user to specify personalized templates for formatting a newspaper, either by editing existing templates or by creating new ones. In any case, each document template specifies page layout information, font information, style information, colors, etc. for the titles, indices/headings, subheadings, text and the like for a personalized newspaper.

Sample code for personal-news-profile editor 16, site driver 36, and profile manager 38 is included in Appendix 3A.

Figure 5A:
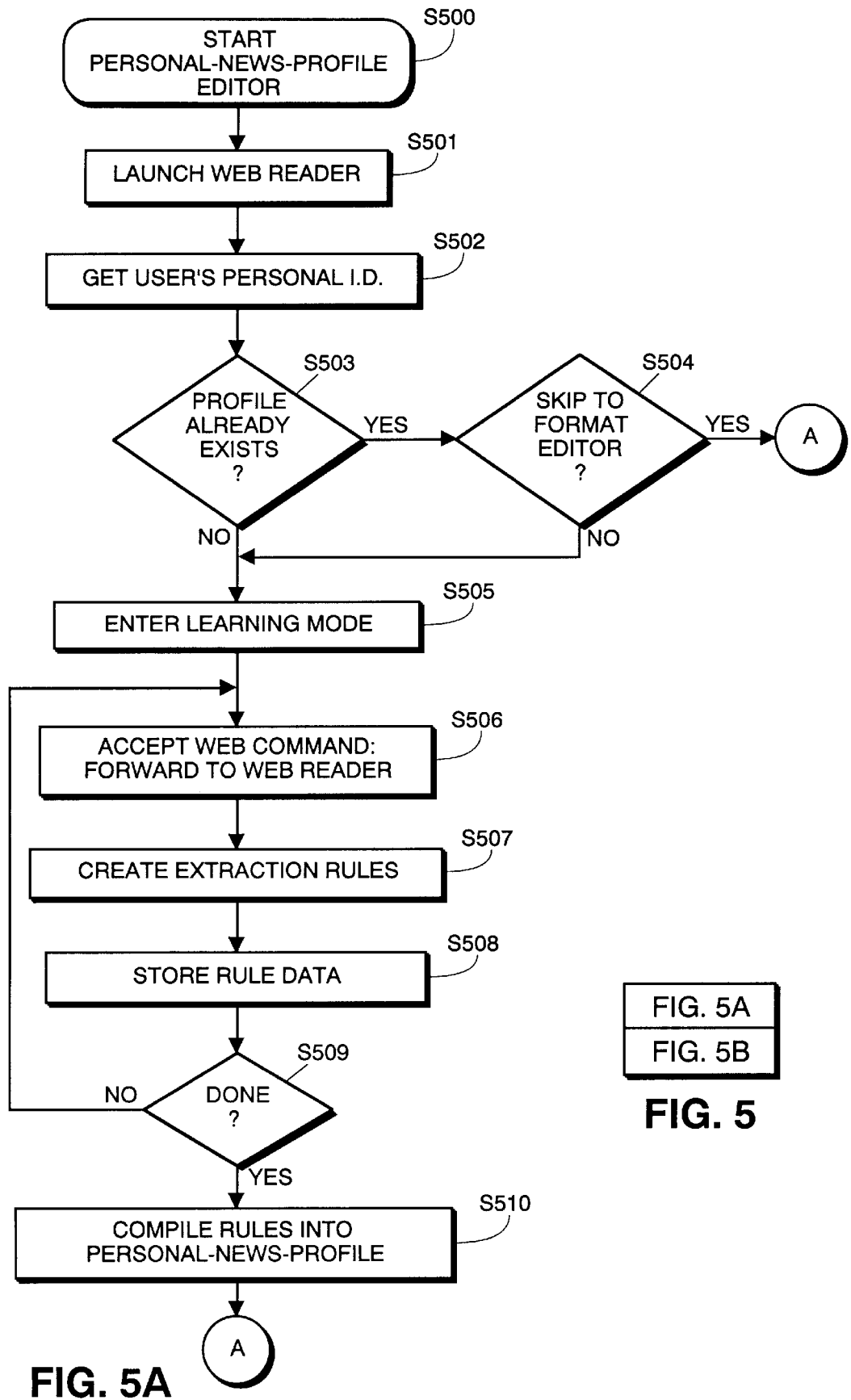
FIG. 5, comprised of FIGS. 5A and 5B, shows flow diagrams describing how a personal-news-profile is created or edited.
Figure 5B:
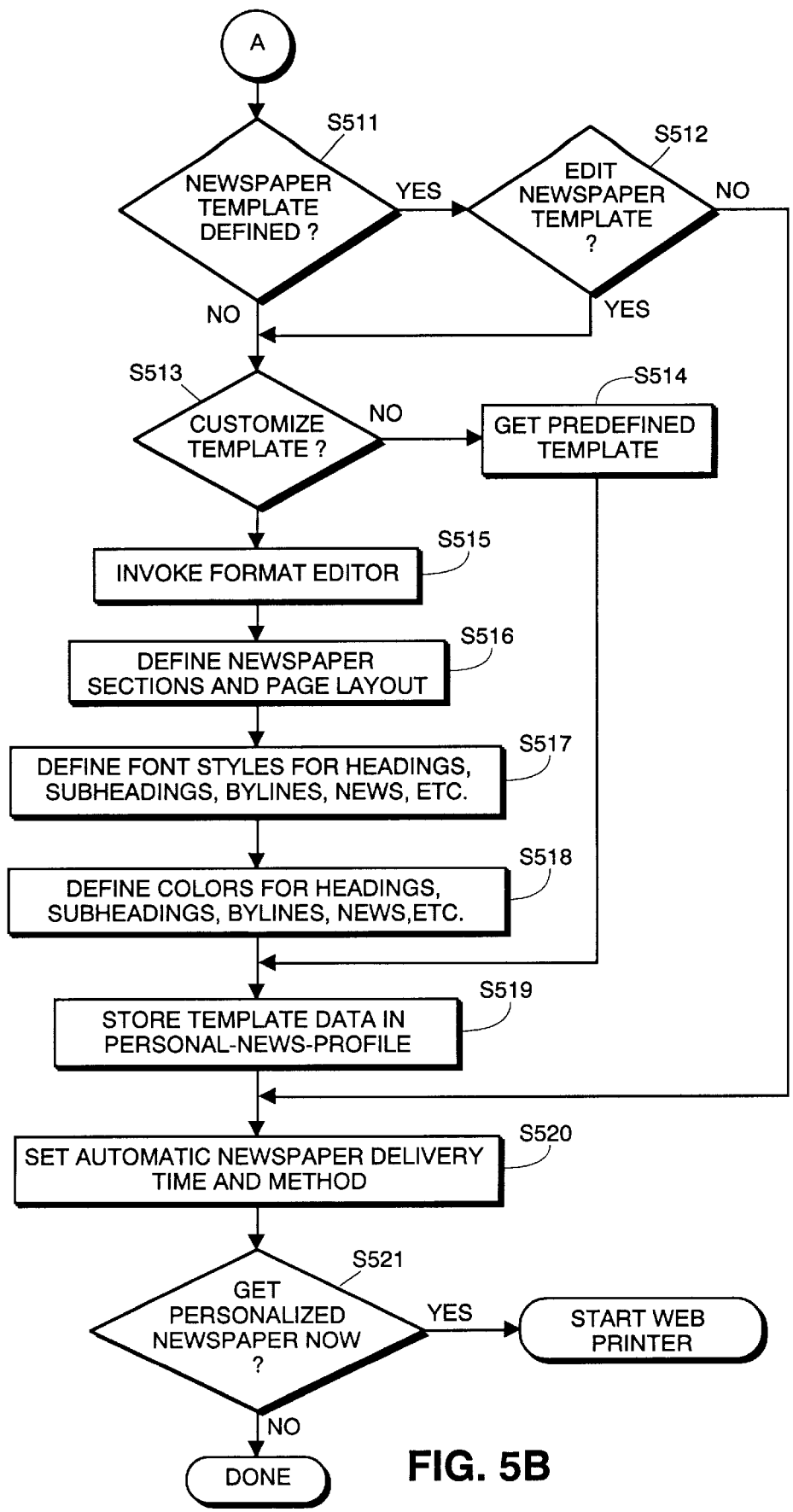

FIGS. 5A and 5B are flow diagrams describing the operation of personal-news-profile editor 16 in more detail. FIG. 5A shows the operation of personal-news-profile editor 16 in defining the parts of personal-news-profile 19 relating to accessing Web sites and retrieving data from those sites.

In step S500 of FIG. 5A, personal-news-profile editor 16 is launched by a user. In step S501, the editor launches Web reader 34. The user's personal I.D. is then retrieved in step S502. If a personal-news-profile already exists for that I.D., step S503 directs flow to step S504, where the user is given the option of skipping to the format editor. Otherwise, personal-news-profile editor 16 enters a "learning mode" in step S505. Once in the learning mode, personal-news-profile editor 16 proceeds to step S506, where it accepts a Web command (i.e., a command to traverse a hypermedia link) from the user and forwards the Web command to the Web reader by means of site driver 36. Site driver 36 maintains a hierarchical log of Web sites visited by Web reader 34. In step S507, personal-news-profile editor 16 creates an extraction rule from the Web command. This rule will allow the news retrieval system to later duplicate the user's selection criteria in browsing (clicking on hyperlinks within) a Web site.

The rule specifies, at the least, structural criteria for duplicating the traversal of the Web site. For example, if a user accesses all articles under a particular index/heading, the rule will specify that all articles under that index/heading should be retrieved.

In one embodiment of the invention, the rule can also include content-based criteria (i.e., keyword-based criteria) accepted from the user. These content-based rules can, for example: (1) require certain words to be in an article, (2) exclude articles with certain words, (3) require certain boolean combinations of words, (4) rank articles that are selected based on structural criteria, with the ranking based on keywords, and then require the selection of the articles with the highest ranking(s), or (5) exclude certain types of articles such as advertisements.

Examples of the syntax for the structural and content-based exclusion rules are shown in Appendix 2. Several different types of rules are shown. Some simply limit the traversal of a Web site to a certain number of links. Others are date and keyword based exclusion rules. One particularly flexible rule indicates that articles should be ranked based on a keyword analysis and the top scoring articles should be chosen. Other rules include "flattening" rules. These rules control the flattening of the extracted data tree, as will be explained in more detail below.

At the least, the rule includes structural information about the user's selection (i.e., first page, first document, all links, etc.), necessary password information, browser commands, and the like. The rule can also include a pointer or a reference to site profile 20 and the appropriate information therein. General (non-user specific) information is used by site driver 36 to maintain site profile 20. In this manner, address information and passwords common to multiple users can be maintained in site profile 20, as discussed above. For example, site driver 36 will store commands or hyperlinks to other documents in a Web page in the rule, but will not store a Web site's full address in the rule. That address information is stored in site profile 20.

In step S508, rule data defining the rule created from a Web command(s) is stored in an extracted data tree such as extracted data tree 27 in FIG. 3B. This data tree is a linked list that reflects the organization of the data retrieved from the Web. In step S509, flow returns to step S506 for the next Web command unless the user is done (i.e., the user signs-off the Web site), in which case flow proceeds to step S510.

At this point, the creation of the personal-news-profile has proceeded much like the creation of a macro common to word processing programs, except that site profile 20 has been used to minimize storage requirements and to centralize general site information. In order to minimize storage requirements further and in order to make the news retrieval system more flexible and efficient, the extracted rules are now compiled to remove redundant links, multiple visits to the same site, and the like. This occurs in step S510, and the resulting compiled rules become the first part of personal-news-profile 19.

Alternatively, personal-news-profile editor 16 may be invoked as a graphical user interface which allows a user to edit a previously stored personal-news-profile or to specify document composition preferences, for example, by specifying news sites, headline articles only, keywords, etc. In either case, the result is personal-news-profile 19, which comprises a listing of Web site pointers as well as extracted rules for traversing through a Web site or sites.

For a better understanding of the above, sample personal-news-profiles and sample site profiles are provided in Appendix 1 as noted above.

Next, operation proceeds to give the user an option to modify a custom newspaper template, as shown in FIG. 5B. In step S511, it is determined if a newspaper template has been defined and stored in personal-news-profile 19. If a newspaper template has been defined, step S512 gives the user the option to edit the template or to proceed to step S520. If the user chooses to edit the template or if no newspaper template has been defined, flow proceeds to step S513.

Step S513 gives the user the option of creating a custom template or using a predefined template. If the user wants to use a predefined template, step S514 gets the specified predefined template, which is added to the personal-news-profile in step S519. Otherwise, flow proceeds to step S515, where format editor 39 is invoked.

Format editor 39 has a graphical user interface that provides the user with a number of formatting options. In step S516, format editor 39 allows the user to define which newspaper sections are to be printed in the newspaper, which Web site's news article are to be placed in each section, and/or how each page is to be laid out. In this regard, the user can specify which Web site's news articles are to be used as a front page, which Web site's news articles are to be used as a business page, which Web site's news articles are to be used as a sports page, etc. In addition, in step S516, the user can define where each index/heading should be listed, as well as what sub-headings should go on each page.

In step S517, format editor 39 allows the user to define the font styles for indices/headings, sub-headings, bylines and actual text of news articles. In step S518, format editor 39 prompts the user to define index/heading colors, title colors, etc. In this regard, layout editor 39 is capable of determining the types of fonts and colors available to the user based on the system's printer capabilities.

Once all of the information is gathered for the custom template, the format editor adds the information to personal-news-profile 19 in step S519. Alternatively, profile manager 38 may also store the custom format as a template in a common area for use by other users. In this case, only a pointer or reference to the custom template is stored in personal-news-profile 19.

In step S520, personal-news-profile editor 16 prompts the user to set an automatic newspaper delivery time and method (i.e., print or store on disk drive 5 for later printing). These settings are added to personal-news-profile 19. More specifically, in the case that a user's computer is continuously supplied with power, the Web news retrieval system can be launched automatically at a designated time. The system will retrieve articles from the Web sites which are listed in personal-news-profile 19. Upon retrieving the news articles, the articles will be formatted based on the newspaper template in personal-news-profile 19. The formatted personalized newspaper can then be either printed or stored for later viewing. In the case that a time is not set for newspaper delivery, the user can execute the Web news retrieval system program at any time.

Once personal-news-profile 19 has been created, the Web news retrieval system, upon being launched, can traverse Web news sites and build a personalized newspaper by automatically retrieving various news articles from the Web news sites and print the news articles based on the newspaper template indicated in personal-news-profile 19. A description of how the Web news retrieval system of the invention performs this function is described next.

Retrieving a Document Using a Personal-News-Profile

Figure 6:
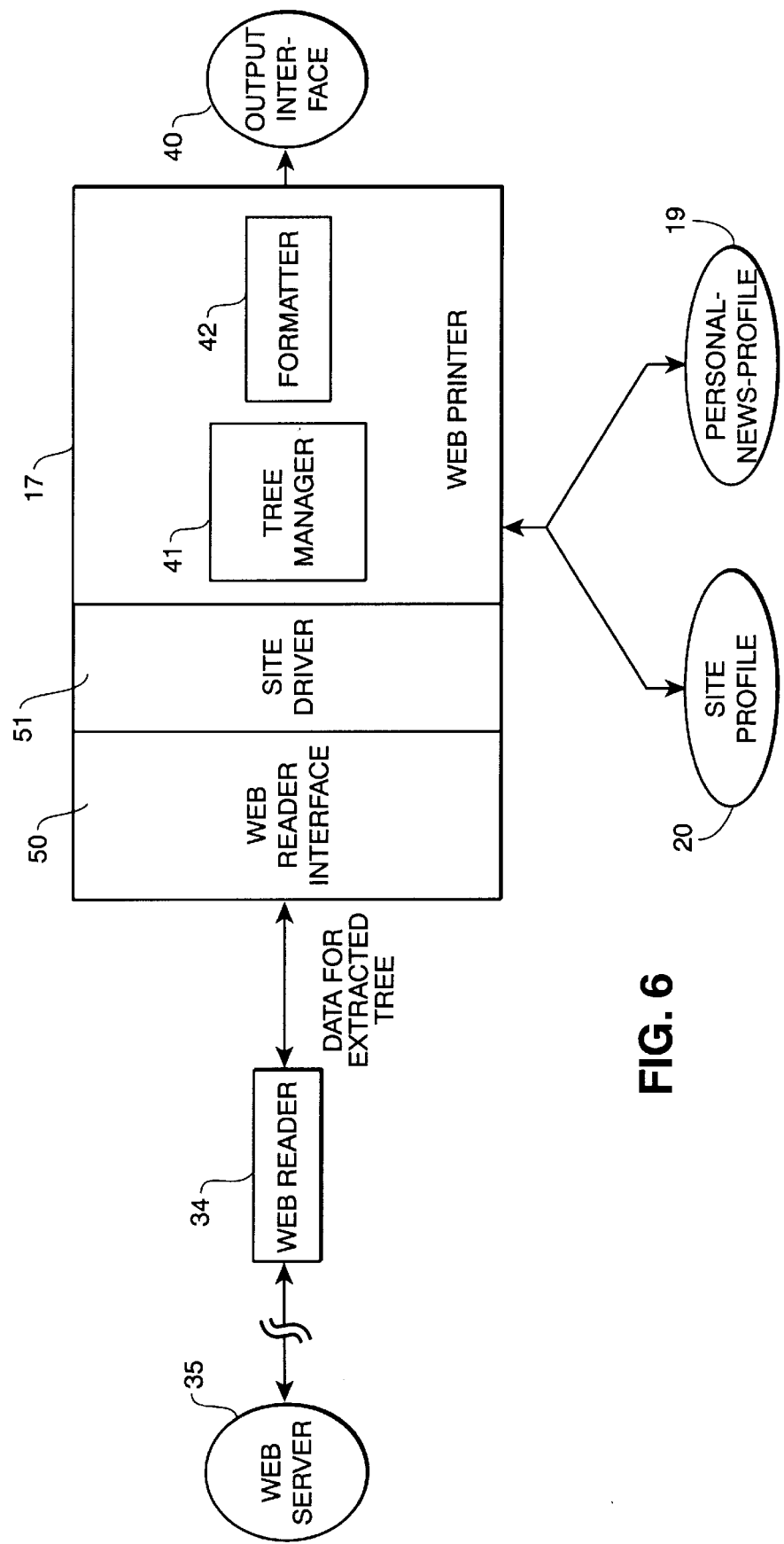
FIG. 6 is a representational block diagram of the manner by which news articles are retrieved from the Web and formatted with reference to a personal-new-profile according to the invention.

FIG. 6 is a representational block diagram of the manner by which the invention retrieves articles from the Web according to personal-news-profile 19. (FIG. 6 also shows the manner by which the retrieved articles are flattened into a linear document and formatted. These functions are discussed in greater detail in the next section of this application.)

As shown in FIG. 6, Web printer 17 is responsible for retrieving news articles. Web printer 17 is an end-user application that communicates with personal-news-profile(s) 19, site profile 20, Web reader 34, and output interface 40 in order to perform this function.

Web printer 17 looks at personal-news-profile 19 to determine which Web sites to access and which data to retrieve from those sites. Web printer 17 also looks at site profile 20 for general site information. According to the information in personal-news-profile 19 and site profile 20, Web printer 17 instructs Web reader 34 to connect to the Web via Web server 35 in order to access various Web sites and to retrieve data from those sites. Web reader 34 sends the retrieved data to Web printer 17, and Web printer 17 uses the data to build an extracted data tree. As will be discussed in greater detail in the next section of the application, Web printer 17 then flattens the extracted data tree into a linear document and formats the linear document for output via output interface 40.

As shown in FIG. 6, Web printer 17 includes four program modules: Web reader interface 50, site driver 51, tree manager 41, and formatter 42.

Web reader interface 50, like Web reader interface 37 described above, interfaces Web printer 17 to Web reader 34.

Site driver 51 accesses site profile 20 and personal-news-profile 19 and provides data stored therein to Web reader 34. As noted above, Web reader 34 uses that data to access various Web sites and to extract data therefrom. As noted above, this retrieved data is used by Web printer 37 to build an extracted data tree.

Tree manager 41 manages the extracted data tree. In this regard, tree manager 41 keeps track of the organization of the retrieved data in the extracted data tree. This allows Web printer 17 to avoid accessing the same article twice, to avoid unnecessarily re-visiting a Web site, and to avoid getting caught in a cycle (loop) in the organization of a hypermedia document on the Web. Alternatively, tree manager 41 could store the data in blocks (as opposed to directly in a data tree) with reference to a linked list that provides the same functionality as the extracted data tree. Sample code for tree manager 41 is included in Appendix 3B.

Formatter 42 is responsible for flattening the extracted data tree into a linear document and formatting the linear document into a personalized newspaper. Formatter 42 performs these functions in accordance with the print criteria and format information (i.e., newspaper template) indicated in personal-news-profile 19. Sample code for formatter 42 is included in Appendix 3B.

Figure 7:
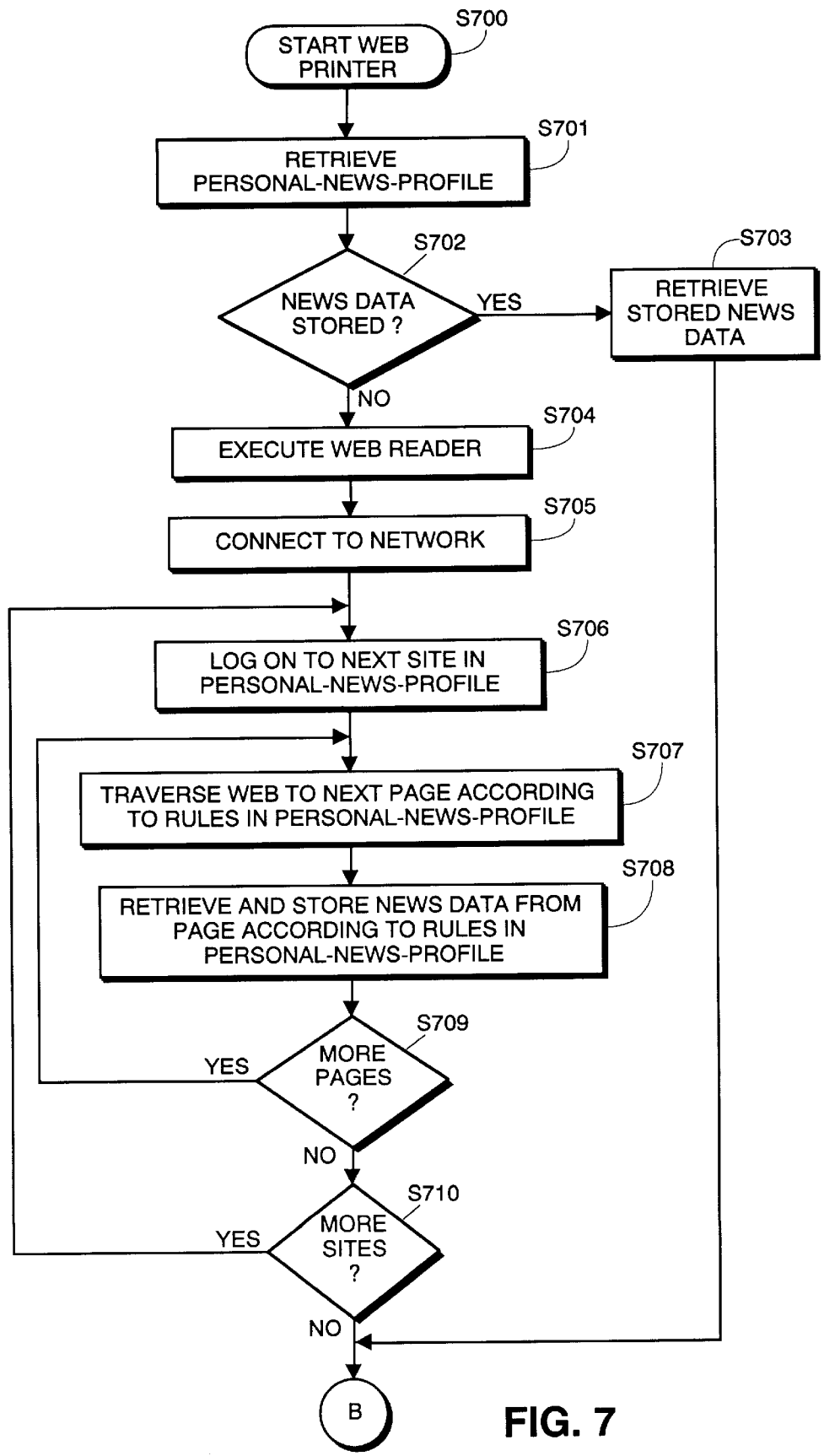
FIG. 7 is a flow diagram describing how news articles are retrieved from the Web with reference to a personal-news-profile.

In more detail, FIG. 7 is a flow diagram describing how Web printer 17 uses Web reader 34 to traverse the Web according to personal-news-profile 19 and to retrieve articles from the Web according to the profile, excluding unwanted data.

The Web printer starts in step S700. In step S701, Web printer 17 retrieves either a user designated personal-news-profile or a default personal-news-profile stored in disk drive 5 using site driver 51. In this regard, because computer equipment 1 may be used by more than one user, there may be one or more personal-news-profiles stored on the equipment, one of which will be designated as the default. Upon retrieving the designated personal-news-profile, in step S702 Web printer 17 determines whether any news data has been previously stored to disk drive 5 (for example, by a previous automatic news delivery) or if news articles should be retrieved using personal-news-profile 19.

Figure 8:
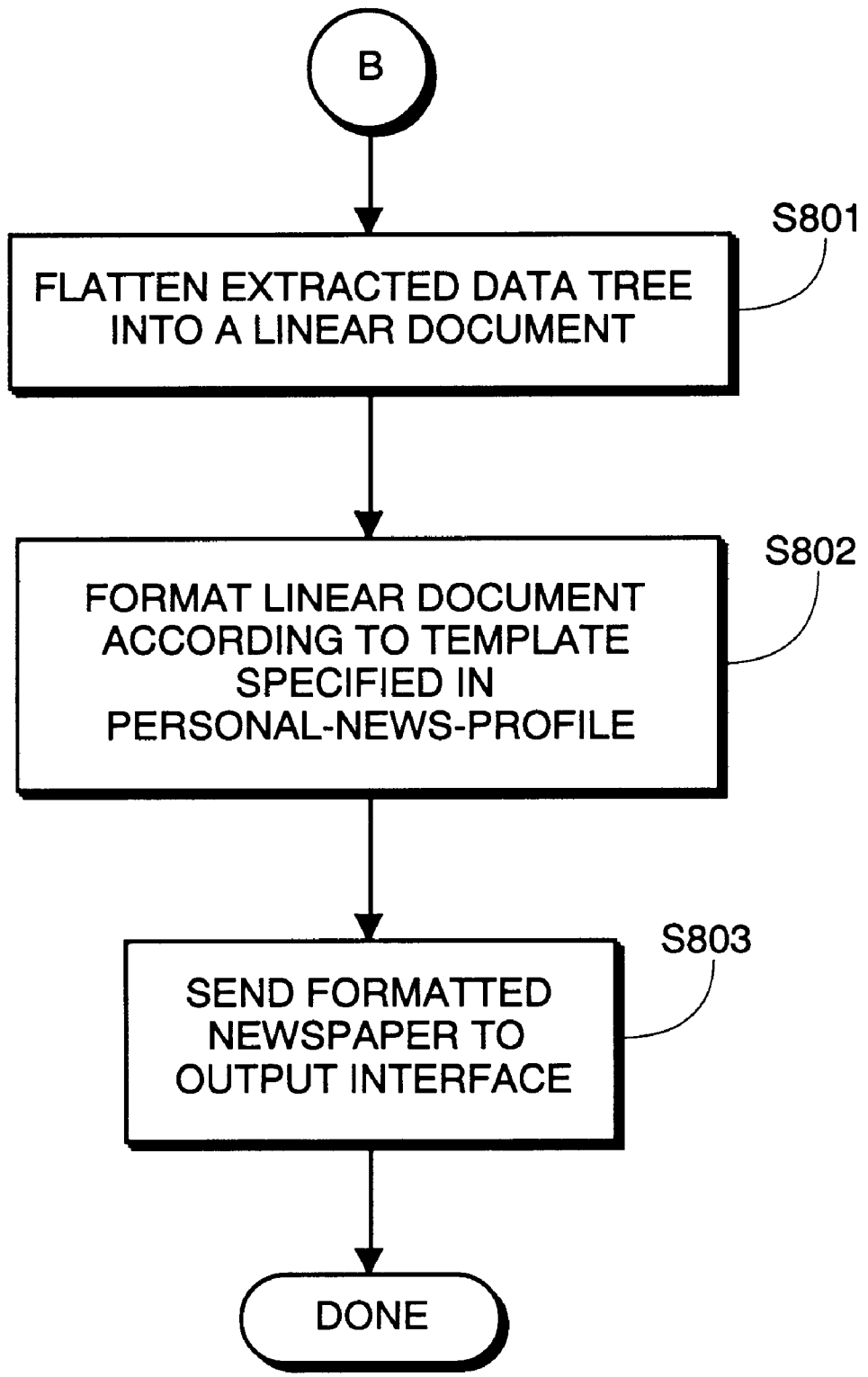
FIG. 8 is a flow diagram showing how retrieved news articles are formatted with reference to a personal news profile and sent to a print device interface.

In the case that news data does exist on disk drive 5, in step S703 the stored news data is retrieved and flow proceeds to step S801 of FIG. 8, discussed in more detail in the next section. On the other hand, if no stored news data exists, Web printer 17 invokes Web reader 34 in step S704. Note that this is the same Web reader 34 as discussed above with respect to defining a personal-news-profile.

Upon being invoked, Web reader 34 connects to Web server 35 in step S705, which provides a connection to a network, such as the World Wide Web. Web printer 17 then provides Web reader 34 with an address for the first Web site to be visited based on information retrieved from personal-news-profile 19. Once connected to the desired Web site in step S706, Web printer 17 provides Web reader 34 with commands/links for traversing the Web to the next Web page containing information that personal-news-profile 19 indicates should be retrieved. Web reader 34 traverses the Web according to this information in step S707.

In step S708, Web reader 34 retrieves the desired information and sends it to Web printer 17 according to the rules in personal-news-profile 19. Thus, data exclusion occurs in this step. The rules in personal-news-profile 19 specify structural and content-based criteria for excluding data from the personalized newspaper. The structural rules limit the retrieved information on the basis of the structure of the Web site accessed by Web reader 34. The content-based rules limit the retrieved information on the basis of its content. As mentioned above with respect to creating a personal-news-profile, examples of the syntax of the retrieval rules in personal-news-profile 19 are included in Appendix 2.

In addition to rule-based exclusion, media-type exclusion occurs in step S708, wherein data of a media type that can not be printed is excluded from the extracted data tree. For example, movie and sound data can be excluded.

Web printer 17 stores the retrieved data in disk drive 5 (or in main memory 14) in the extracted data tree managed by tree manager 41. Alternatively, the data could be stored in blocks with reference to a linked list, as discussed earlier. In step S709, Web printer 17 returns to step S707 to complete retrieving all information from Web pages at the Web site. In step S710, upon completing a traversal of one Web site, Web printer 17 uses tree manager 41 to compare the sites remaining in personal-news-profile 19 with the site organization information in the extracted data tree to determine if more sites need to be visited. In the case that more Web sites need to be visited, step S710 returns flow to step S706 and news articles are retrieved in the same manner as discussed above. On the other hand, if all of the Web sites listed in personal-news-profile 19 have been visited and all of the articles retrieved, flow proceeds to step S801 in FIG. 8.

Flattening and Formatting the Retrieved Data

FIG. 8 is a flow diagram showing how the extracted data tree is flattened and formatted. The configuration of the invention is the same as when retrieving data from the Web (shown in FIG. 6). In fact, the flattening and formatting processes can occur, at least to a limited extent, concurrently with the data retrieval process.

In step S801 of FIG. 8, the extracted data tree is flattened. This simply means that the organization of the data is converted from an extracted data tree to a linear document. This step provides the opportunity for excluding more data from the personalized newspaper, for example by only including nodes of the data tree into the flattened document. This exclusion process is controlled by the flattening rules in personal-news-profile 19.

After the data is flattened into a linear document, the data is formatted in step S802 according to the template indicated in personal-news-profile 19. The definition of this template, which is either a pre-defined template or a custom template, was discussed earlier. Finally, in step S803, the formatted and fully personalized newspaper is sent to output interface 40. This interface could be printer interface 10 to printer 7, display interface 11 to display 2, or even modem/fax interface 6.

Second Embodiment: The HTML Formatter

The second embodiment of the invention is a system for processing a hypermedia document. The system accesses the hypermedia document, extracts addresses from the hypermedia document, and stores the addresses extracted from the hypermedia document in a container. The system activates a processing function to process data stored at the addresses stored in the container, downloads the data stored at the addresses stored in the container into a memory, and extracts predetermined data from downloaded data in accordance with predetermined configuration information. The predetermined data is then formatted in accordance with predefined formatting settings to generate a formatted document, and the formatted document is processed in accordance with the processing function.

The second embodiment of the invention is depicted as HTML formatter 18, noted in FIG. 2. An example of HTML formatter 18 is WebFormatter, manufactured by Canon Information Systems, Inc. The second embodiment will be described with respect to WebFormatter. It should be noted, however, that HTML formatter 18 is not limited to the WebFormatter embodiment, and that various alternative embodiments within the spirit and scope of the following description are possible.

WebFormatter is stand-alone utility software that can be used in conjunction with different Web browsers, such as Netscape, Mosaic and Internet Explorer. In short, WebFormatter extracts data from a Web page, strips out extemporaneous data from the extracted data, and reformats the data into a formatted document. The formatted document can then be printed, stored in an RTF (Rich Text Format) file, or edited in any RTF compatible editor, such as MS Word, WordPerfect, Wordpad, etc.

WebFormatter can be activated from a windowing environment, such as Microsoft Windows®. From such a windowing environment, WebFormatter can be activated by double-clicking on a WebFormatter icon (not shown) in a start-up window, selecting WebFormatter from the Windows start menu, dragging a URL (uniform resource locator) icon (not shown) from a Web browser and dropping it into the WebFormatter icon, or by automatically invoking WebFormatter when the Web browser is started.

Unlike the first embodiment of the invention described above, WebFormatter does not use a predefined personal-news-profile to specify criteria for creating a particular type of document from one or more Web pages. Rather, WebFormatter relies upon user-specified criteria to create a particular type of document, such as a newspaper or the like, from one or more Web pages. These criteria are input interactively by a user via a graphical user interface.

As described in more detail below, WebFormatter operates in two modes—a minimized mode and a fully-functional mode. In the minimized mode, WebFormatter's graphical user interface is essentially a floating print button, which is displayed concurrently with displayed Web pages. By virtue of this feature, as a user explores the Web, the user can process, format, and print out Web pages by merely clicking on the floating print button.

In its fully-functional mode, WebFormatter's graphical user interface provides spaces for a user to enter a URL address of a Web page to be processed, enter a personal title for the document, select a format for the document, preview a formatted first page of the document, and either print the document, save the document as an RTF file, or view/edit the document using an RTF editor. The graphical user interface for the fully-functional mode will be described first, since it is from that interface that the user can enter the minimized mode.

Figure 9A:
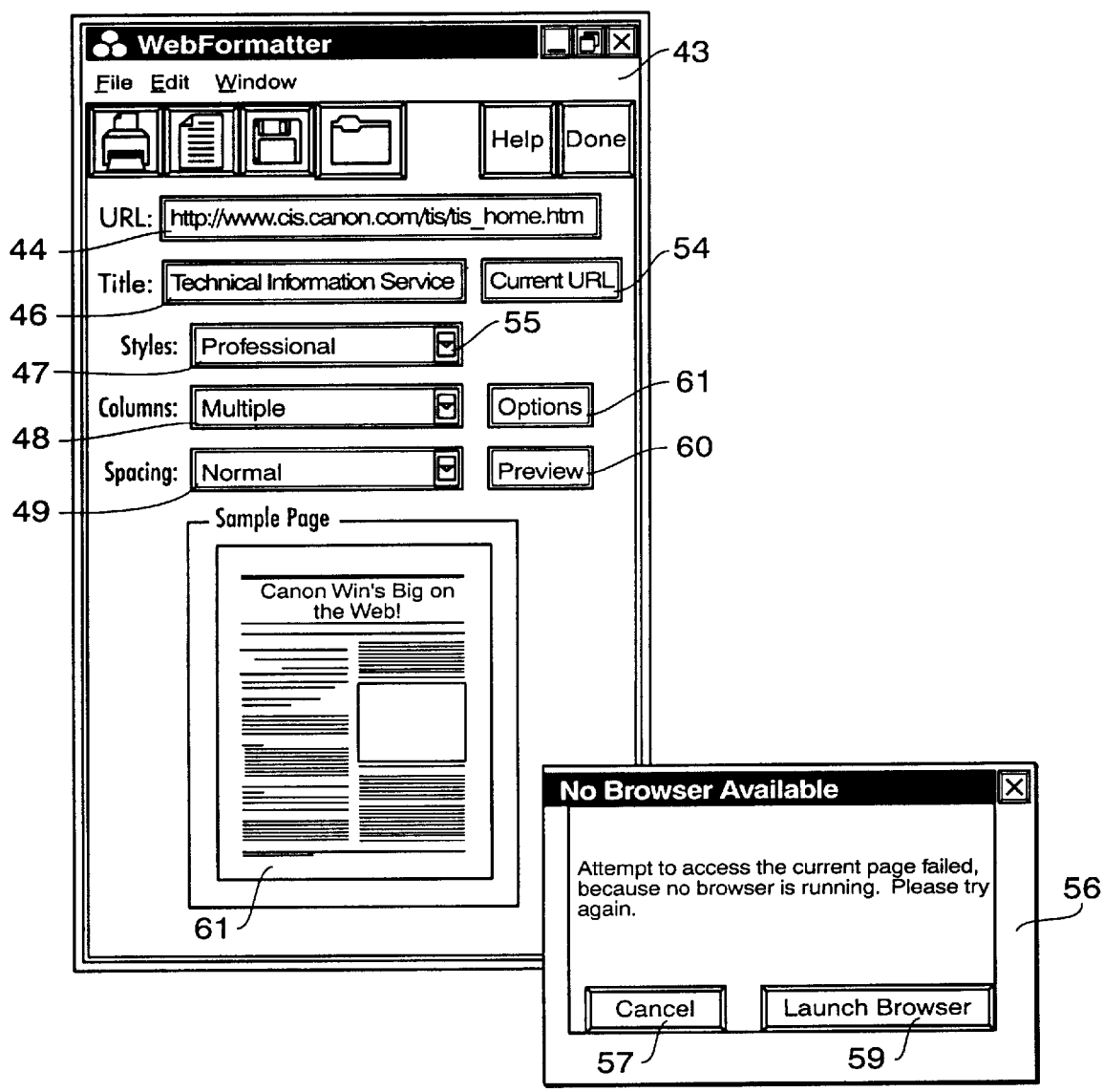
FIGS. 9A to 9E depict a graphical user interface used with the second embodiment of the present invention.

FIG. 9A shows graphical user interface 43 for WebFormatter's fully-functional mode. Graphical user interface 43 is displayed on display 2 upon first activation of WebFormatter. As with any interactive windowing software application, a user interacts with graphical user interface 43 by means of mouse 4 (by pointing and clicking) and keyboard 3.

As shown in FIG. 9A, graphical user interface 43 includes fields 44 and 46 to 49, through which a user can specify the URL address of a document to be formatted and the format of that document. Beginning with URL field 44, a user enters the URL address (e.g., http://www.cis.canon.com/tis/tis_home.htm) of a Web page to be processed by WebFormatter. There are several different ways for the user to enter the URL address. The user can (1) type the address directly into URL field 44, (2) copy the URL address in the Web browser and paste the URL address into URL field 44, (3) drag the URL address from the Web browser onto graphical user interface 43 or onto the WebFormatter icon, or (4) click on Current URL button 54.

With regard to Current URL button 54, if a user clicks on Current URL button 54, WebFormatter locates the active Web browser and queries the Web browser for the address of the current Web page. Thereafter, the Web browser provides the address of the current Web page to WebFormatter, which places the address in URL address field 44. If URL button 54 is activated and no Web browser is currently running, WebFormatter displays dialog box 56, shown in FIG. 9A.

As shown, dialog box 56 includes Cancel button 57 and Launch Browser button 59. Cancel button 57 cancels a user's request to input a URL address into URL address field 44 via Current URL button 54. Launch Browser button 59, on the other hand, launches a Web browser specified in WebFormatter. As noted below, WebFormatter is configured beforehand with predefined information including a Web browser to be used with WebFormatter. Configuration of WebFormatter will be described in more detail below.

In alternative embodiments of WebFormatter, a filename can also be entered into URL address field 44. For example, in these alternative embodiments, if a user wishes to format a hyper-linked manual into a book-like format, the user enters the filename into URL address field 44. Thereafter, WebFormatter proceeds through the file in the same manner as through specified Web pages in order to reformat the hyper-linked manual as desired.

Returning to graphical user interface 43, title field 46 enables a user to enter a personalized title for a formatted document. The title may be typed directly or pasted into title field 46.

Formatting fields 47 to 49 define the format of a document to be output by WebFormatter. Options for the different formatting fields can be accessed by clicking on a scroll bar, such as scroll bar 55, of a respective formatting field. Each of these fields is described in detail below.

Styles field 47 provides four options for formatting an output document. These styles relate to characteristics of an output document such as size of headers, margins, etc. The style options include Contemporary, Formal, Fun and Professional. The invention, of course, is not limited to these four style options, and other styles can be added as desired.

Columns field 48 defines the number of columns in a formatted output document. Two columns options are available—Single and Multiple; however, the invention is not limited to these two options. The Single option, as might be expected, formats the document into a single column. The Multiple option, on the other hand, formats the document into a predetermined number of columns. In preferred embodiments of the invention, the multiple option is set to two columns; however, any number can be set.

Spacing field 49 defines the spacing between lines in a formatted output document. Three options are provided in WebFormatter, but other options can be added as desired. These three options are Condensed, Normal and Easy To Read, with Condensed being the least amount of spacing between lines and Easy To Read being the most amount of spacing between lines.

Graphical user interface 43 is also provided with Preview button 60. By clicking on Preview button 60, a user can preview a first page of a formatted document in viewing area 61. An example of a previewed formatted document is shown in FIG. 9A.

Figure 9B:
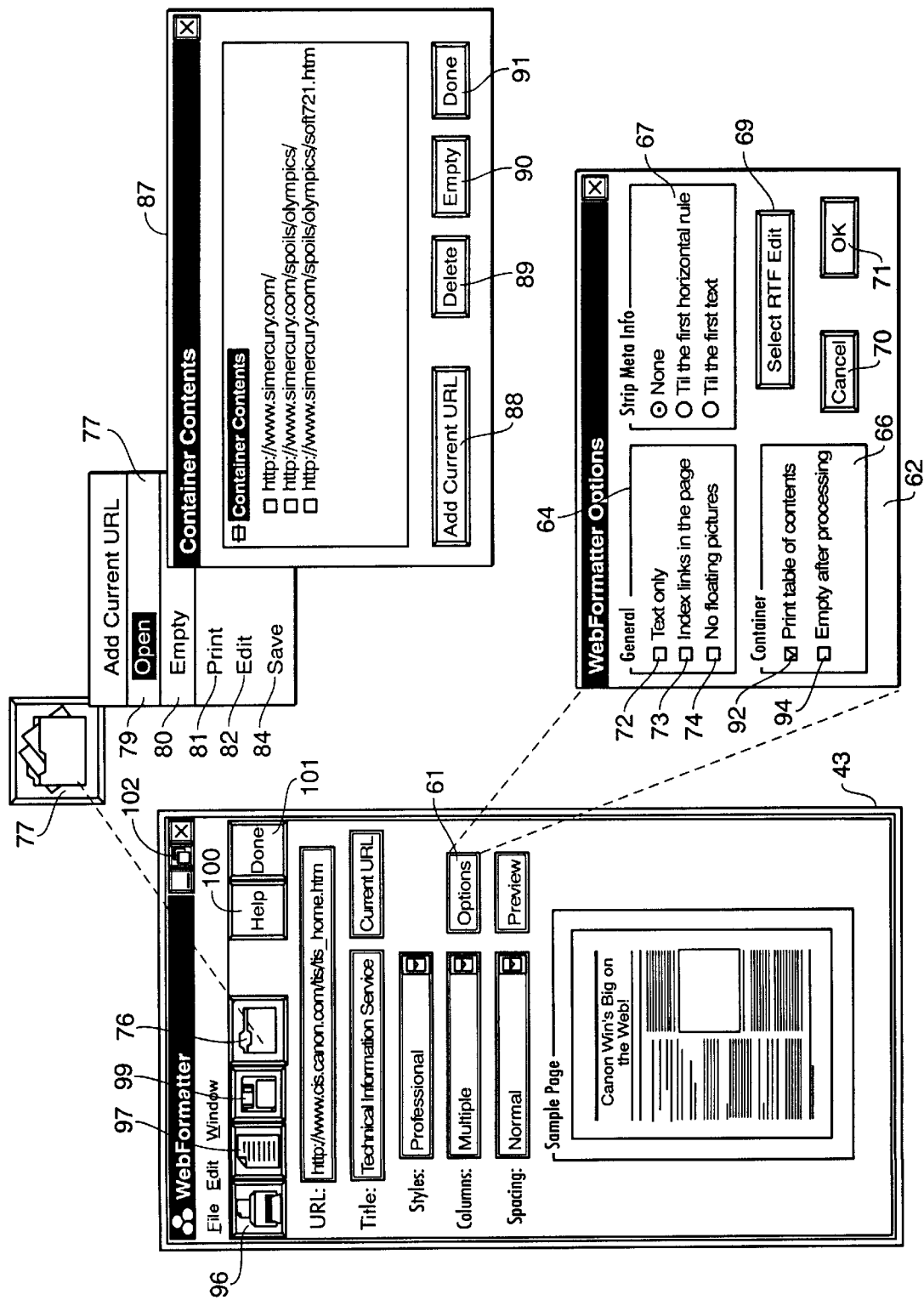

As shown in FIGS. 9A and 9B, WebFormatter also includes Options button 61. Options button 61 provides a user with additional formatting options which are used by WebFormatter to create a formatted document. A user can activate Options button 61 by clicking thereon. This causes Options dialog box 62, shown in FIG. 9B, to appear on display 2.

As shown in FIG. 9B, options dialog box 62 includes General options 64, Container options 66 and Strip Meta Info options 67. General options 64 includes "Text only" listbox 72, "Index of links in the page" listbox 73, and "No floating pictures" listbox 74. These options are indicated as being selected by a check mark or the like in a respective listbox. As will become clear from their descriptions, more than one of the options in General options 64 can be selected at the same time.

"Text only" listbox 72 instructs WebFormatter to strip all graphics in a Web page and print only text therein. "Index of links in the page" listbox 73 instructs WebFormatter to add a list of all URLs present in a Web page or pages to the end of a formatted document. Preferably, the list of URLs is printed as superscript, and anchor positions of the URLs in the list are marked in bold. "No floating pictures" listbox 74 instructs WebFormatter to print all images in the document in a particular area of the formatted document. In some cases, therefore, when this option is selected, WebFormatter shrinks images, as needed, so that images fit into a particular area.

Strip Meta Info options 67 provides engineering options which facilitate stripping of unnecessary information from a Web page being processed by WebFormatter. The options include (1) "None", which instructs WebFormatter to strip nothing from the Web page, (2) "Till the first horizontal rule", which instructs WebFormatter to strip all links and images until and up to predefined first and second horizontal formatting rules (e.g., up until a horizontal line across a page), and (3) "Till the first text", which instructs WebFormatter to strip all links and images up to first and last occurrences of text in the Web page. Only one of Strip Meta Info options 67 can be selected at a time. Selection thereof is indicated by a dot in a bullet located next to an option, as shown in FIG. 9B.

Container options 66 provides options for processing documents, addresses for which are stored in container 76 shown in FIG. 9B. Prior to describing Container options 66, a description of container 76 will be provided.

As noted, container 76 stores URL addresses of selected documents. Document addresses which are input to field 44 are added to container 76. The order in which URLs are input into container 76 denotes the order in which data in the URLs is processed by WebFormatter. As shown in FIG. 9B, once container 76 becomes full, its icon changes to that shown by reference numeral 77.

When a user clicks on the icon for container 76, menu 77 is displayed. Menu 77 provides five options; i.e., Open 79, Empty 80, Print 81, Edit 82 and Save 84. These options are highlighted when activated, and are described in detail below.

Open 79, when activated, displays Container Contents screen 87 shown in FIG. 9B. Container Contents screen 87 shows the URL addresses stored in container 76. Container contents screen 87 provides four buttons; i.e., Add current URL button 88 which adds the current URL to container 76, Delete button 89 which permits a user to highlight and delete a URL in container 76, Empty button 90 which permits a user to empty container 76, and Done button 91 which permits a user to close Container Contents screen 87. It is noted that a user can also empty the contents of container 76 by clicking on Empty 80 of menu 77.

In addition, the user can rearrange the order of URLs stored in container 76 by dragging and dropping different URLs at different locations therein. As noted above, since the URLs are processed in the order that they appear in container 76, this feature permits a user to rearrange the processing order of the URLs in container 76 interactively.

Print 81, Edit 82 and Save 84, when activated, cause WebFormatter to download all data at Web pages defined by the URLs stored in container 76, format them as specified by the user, create RTF file(s) storing the formatted Web pages, and do the selected action, i.e., save, edit or print the RTF file(s). This process is described in greater detail below.

Referring back to Options dialog box 62, Container options 66 include "Print table of contents" listbox 92 and "Empty after processing" listbox 94. As shown, a check mark appears in a listbox to indicate that the listbox has been selected. In this regard, more than one listbox can be selected at a time. "Print table of contents" listbox 92, when selected, instructs WebFormatter to print titles of all URLs in container 76 as a table of contents in a formatted output document. "Empty after processing" listbox 94, when activated, instructs WebFormatter automatically to empty container 76 after printing, editing or saving a document, without waiting for a user to do so.

Also shown as part of Container options 62 are Select RTF Editor button 69, Cancel button 70 and OK button 71. By clicking on Select RTF Editor button 69, a user can select an RTF file editor, examples of which are noted above. This can be done, for example, by displaying another dialog box listing predefined RTF editors (not shown) and selecting one of the predefined RTF editors. Cancel button 70 cancels Container options 62 and OK button 71 confirms selected options in Container options 62 and then closes its dialog box.

As shown in FIG. 9B, graphical user interface 43 also includes print icon 96, edit icon 97, save icon 99, help button 100, done button 101 and minimizing icon 102. A user may select any of these features by clicking thereon using a mouse.

Print icon 96 opens a print dialog box (not shown), which allows a user to print any number of copies of Web pages formatted by WebFormatter. Edit icon 97 opens an RTF file storing formatted Web page(s) for editing by a predetermined RTF editor. Save icon 99 opens a save dialog box (not shown), which allows the user to name and save a formatted Web page as an RTF file. Help button 100 provides help messages for operating WebFormatter, and Done button 101 exits from WebFormatter. Minimizing icon 102 activates the minimizing mode of Webformatter which was mentioned above and which is described in greater detail below.

Figure 9C:
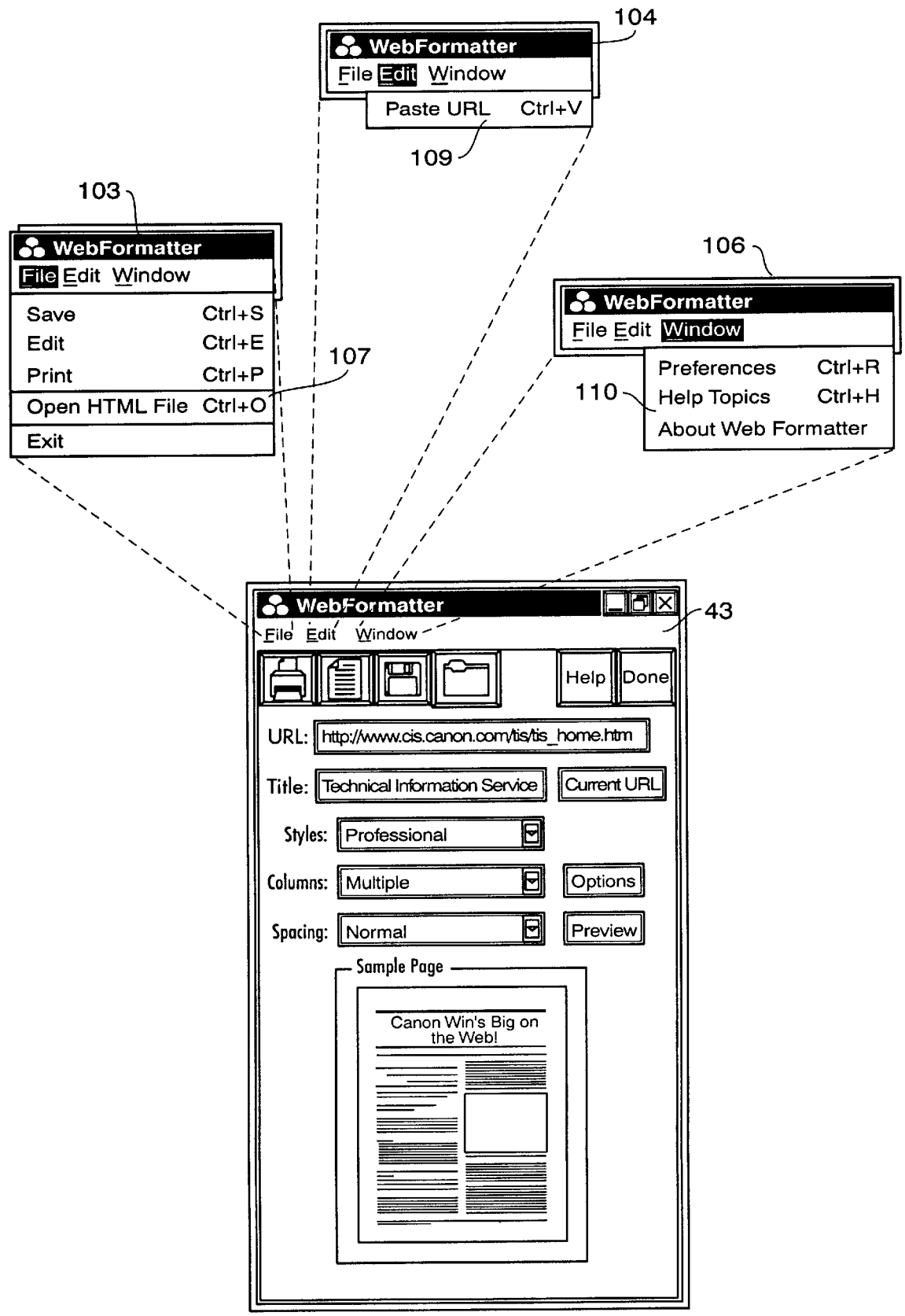

FIG. 9C shows menus provided by WebFormatter during its operation. These menus include file menu 103, edit menu 104 and window menu 106. File menu 103 provides "Save", "Edit" and "Print" options, the functions of which are identical to those of Save icon 99, Edit icon 97 and Print icon 96, respectively. An "Exit" option is also provided to exit from File menu 103. Finally, File menu 103 provides "Open HTML file" option 107. This option provides a user with the capability to open a local HTML file; i.e., a hypermedia file resident on the user's computer such as a file saved from NetScape, or URL files created by dragging and dropping a URL onto the windows desktop. "open HTML file" option 107 also provides hooks needed to open files created by other Web-file-processing products so that those files can be formatted as RTF files and printed, saved and/or edited using WebFormatter.

Edit menu 104 provides "Paste URL" option 109. "Paste URL" option 109 pastes the contents of a paste buffer, such as a URL address copied from a Web page, into URL field 44, as described above.

Window menu 106 provides a "Help Topics" option which provides a user with information regarding the use, maintenance and background of WebFormatter, and an "About WebFormatter" option which provides a user with a dialog box (not shown) containing WebFormatter's version number and copyright notice(s). Window menu 106 also includes "Preferences" option 110. "Preferences" option 110 opens preferences dialog box 112, shown in FIG. 9D.

Figure 9D:
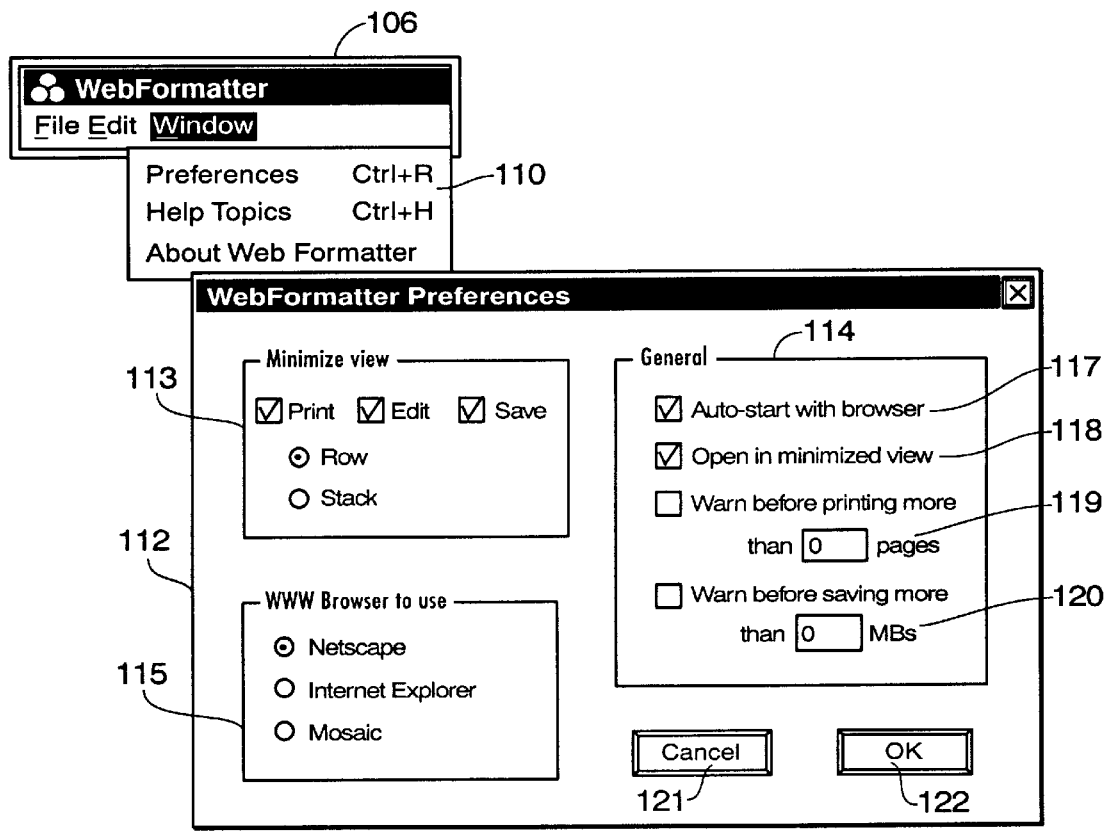
Figure 9E:
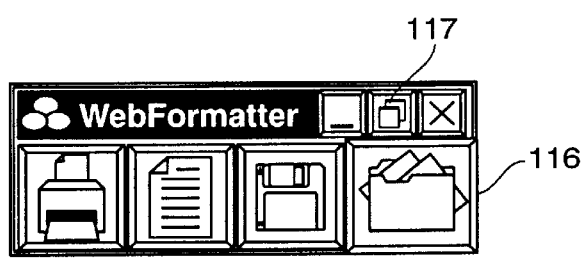

Preferences dialog box 112 is used to configure and re-configure WebFormatter. As shown in FIG. 9D, preferences dialog box 112 includes Minimize view options 113, General options 114 and WWW Browser to use options 115. Minimize view options 113 can be set to configure Web-Formatter's graphical user interface in the minimized mode. Two sets of options are provided. The first set include "Print", "Edit" and "Save". These options correspond to print icon 96, edit icon 97 and save icon 99, shown in FIG. 9B. When a check mark appears in a listbox next to one of these options, the icon for that option is displayed in the minimized mode, e.g., the print icon, the edit icon and/or the save icon. More than one option can be selected at once. In this regard, FIG. 9E shows graphical user interface 116, which is a representative example of a graphical user interface for WebFormatter when WebFormatter is in the minimized mode.

Referring back to FIG. 9D, Minimize view options 113 also include "Row" and "Stack" options. These options can be set to display WebFormatter's graphical user interface in the minimized mode horizontally by selecting "Row" or vertically by selecting "Stack". Only one of these options can be selected at a time. As an example of the foregoing, graphical user interface 116 corresponds to a row of icons.

WWW Browser to use options 115 determine which World Wide Web browser is to be used with WebFormatter. As shown, preferably NetScape, Internet Explorer and Mosaic are provided as browser options; however, other browser options can also be provided. As might be expected, only one of these options can be selected at a time. The default browser option is NetScape Navigator.

General options 114 include "Auto-start with browser" option 117, "open in minimized view" option 118, "Warn before printing more than _pages" option 119, and "Warn before saving more than _MBs" option 120. "Auto-start with browser" option 117 sets WebFormatter to be invoked automatically when a Web browser is activated. If this option is not selected (which is the default), WebFormatter is opened by double clicking on a WebFormatter icon in the windowing environment, selecting WebFormatter from the Windows start menu, or dragging and dropping a URL from the Web browser into the WebFormatter icon, as described in more detail above. "Open in minimized view" option 118, when selected, opens WebFormatter in minimized mode. The default, however, is the fully-functional mode. "Warn before printing more than _pages" option 119, and "Warn before saving more than _MBs" option 120 allow a user to control the number of pages saved of a formatted document and the amount of memory space used by those pages, respectively. The default for both of these options is for no warning to be given. As is evident, more than one of the general options can be selected at the same time.

Preferences dialog box 112 also includes cancel button 121 which cancels a user's selected preferences and OK button 122 which confirms a user's selected preferences.

As explained above, WebFormatter can be configured to enter directly into the minimized mode via Preferences dialog box 112, or a user can enter the minimized mode via minimizing icon 102 shown in FIG. 9B. As also noted above, FIG. 9E shows an example of graphical user interface 116 for WebFormatter in the minimized mode. Graphical user interface 116 is displayed as a floating interface while a user is exploring the Web. Thus, as a user views a Web page, the user also views graphical user interface 116. By clicking on an appropriate icon on graphical user interface 116 (which, in FIG. 9E, includes icons identical in both structure and function to those shown in graphical user interface 43), the user can capture the current Web page, process and format the Web page into an RTF file, and save, edit and/or print the RTF file. Alternatively, the user can drag a URL from the Web browser and drop it into one of the icons.

A user can reconfigure WebFormatter in the minimizing mode by double clicking a right mouse button. This action causes a preferences dialog box to appear on display 2 which is identical to preferences dialog box 112. Thereafter, the user can alter the configuration of WebFormatter as desired. Should a user wish to enter the fully-functional mode from the minimizing mode, the user need merely click on maximizing icon 117 shown in FIG. 9E.

Figure 10:
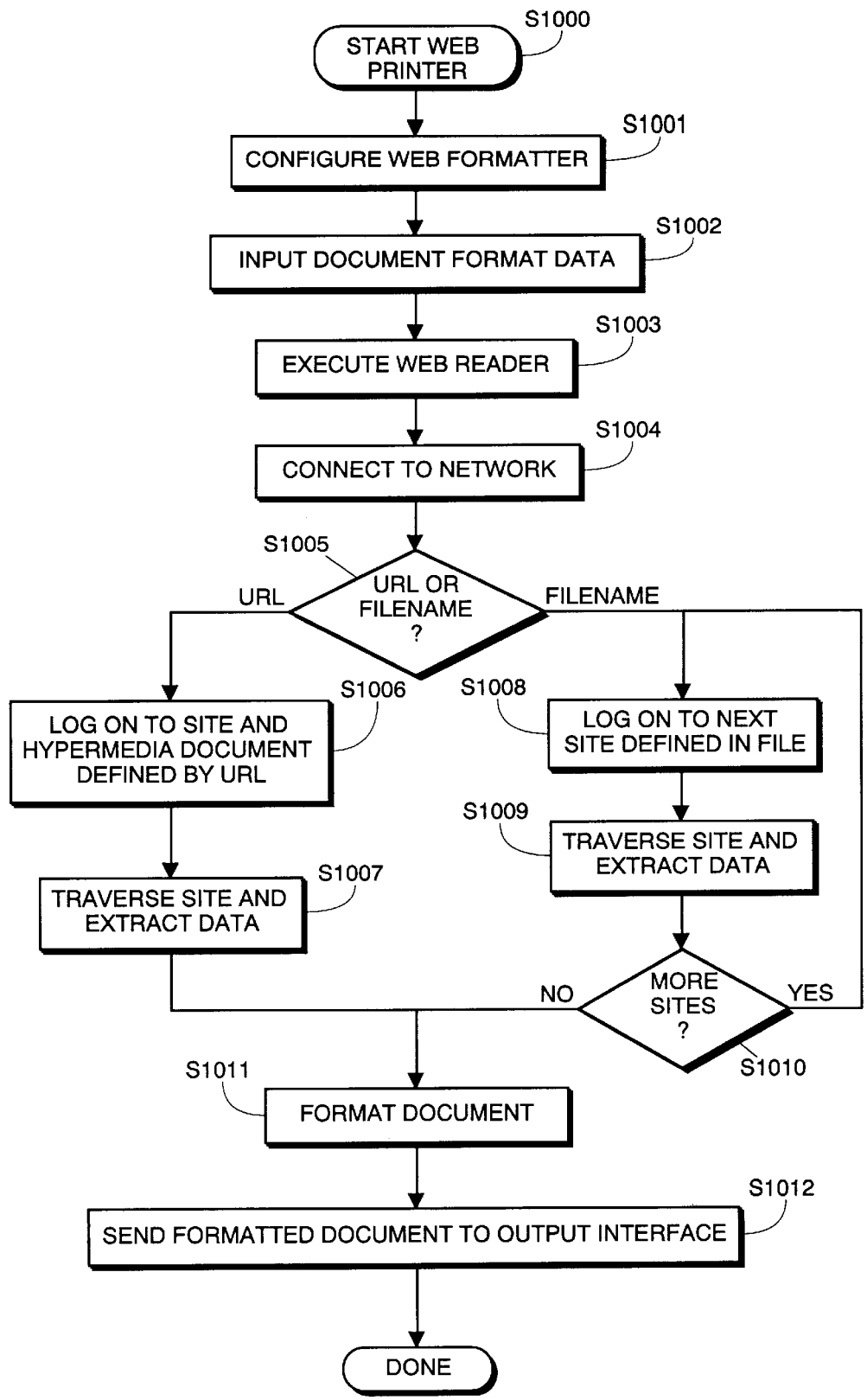
FIG. 10 is a flow diagram describing the operation of the second embodiment of the invention.

FIG. 10 is a flow diagram describing the operation of WebFormatter. WebFormatter is activated in step S1000. As described above, this can be done by double-clicking on a WebFormatter icon in a windowing environment. Depending upon how WebFormatter has been configured, i.e., in the fully-functional mode or the minimizing mode, either a graphical user interface similar to that of graphical user interface 43 or one similar to that of graphical user interface 116 is displayed in step S1000. For the sake of completeness, the following assumes that a graphical user interface similar to that of graphical user interface 43 is displayed in step S1000, since the default mode of WebFormatter is the fully-functional mode.

Next, in step S1001, WebFormatter is configured, as described above via preferences dialog box 112 and options dialog box 62. This step is not necessary unless a user wishes to change WebFormatter's previously set configuration. In step S1002, document format data is input in fields 44 and 46 to 49 described above. More specifically, the user inputs a URL (or filename in alternative embodiments) into URL field 44. As described below, WebFormatter uses this information to process Web pages stored at the URL to create an RTF file based on the configuration of WebFormatter and the data input in fields 46 to 49.

In step S1003, a Web reader similar to that of Web reader 34 described above is executed. The Web reader connects to a network, such as the World Wide Web, in step S1004.

Next in step S1005, it is determined whether a URL or a filename has been entered. As described above, in preferred embodiments of WebFormatter, only a URL may be entered. However, since alternative embodiments of WebFormatter may permit entry of a filename, a description of processing a file other than one at a URL address will be provided.

If a URL has been entered in field 44, processing proceeds to step S1006. In step S1006, the Web reader accesses the hypermedia document (e.g., a homepage) specified by the URL address. In step S1007, WebFormatter instructs the Web reader to traverse the hypermedia document. Thereafter, WebFormatter selects URL address(es) from the Web and stores the addresses in container 76. Once all desired addresses have been selected and a processing function, such as print, has been activated, WebFormatter downloads data stored at the addresses in container 76 into memory 5. WebFormatter then extracts predetermined data from the downloaded data based on the configuration information set in Optional dialog box 62, and stores the extracted data in memory 5. Thus, for example, if "Text Only" option 72 in Options Window 62 is on, only text is extracted from the downloaded data. Processing then proceeds to step S1011.

On the other hand, if, in step S1005, a filename for an HTML source file is entered, WebFormatter instructs the Web reader to access a first site in the file. In steps S1008 and S1009, the site is traversed and data is extracted and stored in the same manner as in step S1007, described above. Then, in step S1010, WebFormatter determines if more sites are listed in the HTML source file. If more sites are listed in the file, flow returns to step S1008, and the next site is accessed. If no more sites are present, processing proceeds to step S1011, In step S1011, WebFormatter processes the extracted data in accordance with the previously set format information. For example, if Columns field 48 is set to multiple, the extracted data will be formatted into a document having multiple columns. The above processing is initiated by activating one of Print icon 96, Edit icon 97 or Save icon 99, and is similar to the processing described above in the first embodiment, e.g., flattening the document and formatting the document based on the formatting information. Accordingly, a detailed description thereof is omitted for the sake of brevity.

Once the documents whose URLs are stored in the container have been downloaded, formatted according to the preset formats and configurations, and converted into RTF file(s) in step S1011, in step S1012, the RTF file(s) are output. Alternatively, the RTF files(s) can be edited or saved, depending upon which icon on the graphical user interface has been activated.

The invention has been described with respect to particular illustrative embodiments. It is to be understood that the invention is not limited to the above described embodiments and modifications thereto, and that various changes and modifications may be made by those of ordinary skill in the art without departing from the spirit and scope of the appended claims.

APPENDIX 1

SAMPLE USER PROFILE

The User Profile is implemented in windows.ini file format.
[Defaults]
Count = 4

APPENDIX 1-continued

Title = My Daily Paper
[1]

Heading = News In Brief
Site = 1
Section = Front Page
MaxLevels = 5
Maxpages = 10
MaxKBytes = 2000
Date = today
Print = level 0
Template = 1
[2]

Heading = Sports In Brief
Site = 2
Section = Sports
Max Levels = 0
MaxPages = 10
MaxKbytes = 200
KeywordFilter = "Football" AND "49ers"
Date = today
Print = level 0
Template = 1
[3]

Heading = Money Matters
Site = 1
Section = Business
MaxLevels = 1
MaxPages = 100
MaxKBytes = 20000
KeywordFilter = "Computer" OR "hardware" OR "Software"
Date = today
Print = all
Template = 2
[4]

Heading = Sri Lanka
Site = 3
Section = HotNews
MaxLevels = 1
MaxPages = 100
MaxKBytes = 20000
Date = today
Print = leaves
Template = 2

SAMPLE SITE PROFILES

Legend:
%W-day of the week
%s-section part of URL
[Defaults]
Count = 3
[1]

Title = San Jose Mercury News
Username = mwickram
Password = cannon
StartData = StartHeadlines
EndData = EndHeadlines
Home Page = http://www.sjmercury.com/
SectionURL = http://www.sjmercury.com/%S.htm
SectionCount = 9
Section 1 = Front Page
Section 2 = International
Section 3 = National
Section 4 = Local & State
Section 5 = Editorials Commentary
Section 6 = Business
Section 7 = Sports
Section 8 = Living
Section 9 = Entertainment
[1. Sections]

Front Page = front
International = intl

APPENDIX 1-continued

```
National = natl
Local & State = loc
Editorials & Commentary = edit
Business = biz
Sports = spts
Living = liv
entertainment = ent
[2]

Title = The San Francisco Chronicle
Home Page = http://www.sfgate.com/chronicle/
SectionURL = "http:www.sfgate.com/cig-
bin/chronicle/article-
list.cgi?%/S:/chronicle/today"
Section Count = 5
Section 1 = News
Section 2 = Business
Section 3 = Sports
Section 4 = Editorial
Section 5 = Datebook
[2. Sections]

News = News:MN
Business = Business:BU
Sports = sports:SP
Editorial = Editorial:ED
Datebook = Datebook:DD
[3]

Title = The Day News
Hoxne page =
http://www.landa.net/lakehouse/anclWeb/dailynew/
SectionURL = "http://www.lanka.net/lakehouse/anclW
eb/dailynew/%W/WS.html"
SectionCount = 12
Section 1 = Business
Section 2 = Editorial
Section 3 = Features
Section 4 = Foreign
Section 5 = Letters
Section 6 = InBrief
Section 7 = HotNews
Section 8 = Probes
Section 9 = Military
Section 10 = Politics
Section 11 = Obituaries
Section 12 = Sports
[3. Sections]

Business = business/intro
Editorial = editorial/final
Features = features/intro
Foreign = foreign/intro
Letters = letters/final
InBrief = inbrief/intro
HotNews = hotnews/intro
Probes = proves/intro
Military = military/intro
Politics = politics/intro
Obituaries = obiturai/intro
Sports = sports/intro
```

APPENDIX 2

SYNTAX FOR RETRIEVAL, EXTRACTION AND PRINTING CRITERIA

```
Maximuin levels to search: MaxLevels =<#>
-1: to retrieve all levels
0 - n: to retrieve up to n levels
Maximum pages of the document: MaxPages = <#>
n: final document not more than n pages
Maximum size of the document: MaxKBytes = <#>
n: document size not more than n kilo bytes
Exclusion rules:
Date = today|lessthan <#>
```

APPENDIX 2-continued

SYNTAX FOR RETRIEVAL, EXTRACTION AND PRINTING CRITERIA

```
today: retrieve only articles posted today
lessthan <#>;n: retrieve only articles no
more than n days old
Retrieve = all|nosubdir|nothisdir|thissiteonly
all: allow to fetch pages from other sites
nosubdir: exclude URLs to subdirectories
nothisdir: exclude URLs in this directory
thissiteonly: fetch pages from this site only
Keyword search:
KeywordFilter = <keyword> (AND|OR|NOT) <keyword>:
accumulate only pages containing the
combination of keywords
KeywordRank = <#>;n: use fuzzy logic to rank
pages according to keyword combination in
KeywordFilter and keep top n ranked pages
KeywordAuthor = <author>: accumulate only
pages authored by author
ExcludeType = ads|nonEnglish
ads: exclude advertisements
nonEnglish: exclude articles that are not in
English
Flattening rules: Print = all|leaves|level = <#>
all: include all nodes in the tree in the linear
document
leaves: include all leaves in the tree in the
linear document
level = <#>;n: include up to nth level of the tree
in the linear document
Formatting rules: Template = <#>
n: print according to default or user template
number n
```

APPENDIX 3

DESCRIPTION OF MODULES
Appendix 3A

THE PERSONAL NEWS PROFILE EDITOR MODULE

The Profile Editor manages access to the user profiles and is represented by CProfileMgr class. It also manages loading and saving of the profiles. The services provided by Profile Editor are:
    BOOL Newprofile(CString fileName);
        Creates a new profile given the file name.
    BOOL OpenProfile( );
        Opens the default profile.
    BOOL OpenProfile(CString fileName);
        Opens the named profile.
    CProfileEntry* GetFirstEntry( );
        Loads and returns the next profile entry.
    CProfileEntry* GetNextEntry( );
        Loads and returns the next profile entry.
    BOOL WriteEntry(CProfileEntry& entry);
        Saves a new entry in the profile.
Each profile entry contains an extraction specification and an output specification as represented by CProfileEntry class. The methods provided are:
    CURL GetSiteId( );
        Returns the site id contained in the profile entry.
    CExtractionSpec GetExtractionSpec( );
        Returns the extraction specification contained in the profile entry. Extraction specification contains keywords for searching, limits for levels, pages, size in kilo bytes.
    COutputSpec GetOutputSpec( );
        Returns the output specification contained in the profile entry. Output specification contains formatting instructions and tree traversal rules.

THE Web READER MODULE

CWebPage class abstracts the interface to the Internet browser and is representative of the actual Web page. It will be responsible for fetching a Web page, extracting links or references to other URLs in the Web page, and maintaining the contents of a Web page. The methods provided are:

APPENDIX 3-continued

```
    BOOL Load( );
        Fetch the Web page using the URL, username and password.
    BOOL Parse( );
        Parses the data in the Web page and creates a list of links.
        Also resolves the relative URLs into absolute URLs.
    CURLList* GetLinks( );
        Returns the list of links in the Web page.
    CPageData* GetData( );
        Returns the actual text data contained in the Web page.
    void FilterContent( );
        Extracts title and other information according to the site
        data.
    CString GetTitle( );
        Returns title and other information according to the site
        data.
    CString GetAuthor( );
        Returns the author of the Web page.
    int GetSize( );
        Returns the size of the data in kilo bytes.
CNetwork class will encapsulate OLE functionality and provides
communication with the Internet browser.
    CString GetUsername( );
        Determine the currently set username.
    void SetUsername(LPCTSTR);
        Set the current username in the CNetwork object.
    CString GetPassword( );
        Determine the currently set password.
    void SetPassword(LPCTSTR);
        Set the current password in the CNetwork object.
    void Close( );
        Disconnect any active connection and reset the
        CNetwork object.
    short Read (BSTR*pBuffer, shortiAmount);
        Read data retrieved by the Browser.
    long GetStatus( );
        Query the status of the current load.
    BOOL Open(LPCTSTR pURL, shortiMethod,
    LPCTSTR pPostData, long IPostDataSice,
    LPCTSTR pPostHeaders);
        Initiates the retrieval of a URL from the network.
    CString GetErrorMessage( );
        Provide the caller with internally generated error messages.
    short GetServerStatus( );
        Determine the error status reported by the server.
    long GetContentType( );
        Return the content length (total amount of bytes) of the
        current load.
    CString GetContentEncoding( );
        Return the MIME encoding of the current load.
    CString GetExpires( );
        Return when the data retrieved by this load is no longer
        considered valid.
    CString Resolve(LPCTSTR pBase, LPCTSTR
    pRelative);
        Generate an absolute (fully qualified) URL.
    BOOL IsFinished( );
        Determine if a load is complete.
    short BytesReady( );
        Inform the caller of the number of bytes prepared to be read.
THE SITE DRIVER MODULE The Site Driver will provide the site information to the Web Reader. The
Site Driver is functionally similar to the Profile Editor and is
represented by CSiteDriver class. Services provided are:
    BOOL NewProfile(CString fileName);
        Creates a new profile given the file name.
    BOOL OpenProfile( );
        Opens the default profile.
    BOOL OPenProfile(CString fileName);
        Opens the named profile.
    CSiteProfile* GetFirstSite( );
        Loads and returns the first site entry.
    CSiteProfile* GetNextSite( );
        Loads and returns the next site entry.
    BOOL WriteEntry(CSiteProfile& entry);
        Saves a new entry in the profile.
    int NumberOfSites( );
        Returns the number of sites specified in the profile.
An entry in the site profile will contain information about the base
```

APPENDIX 3-continued

```
URL of the site, title of the news source, information about how to access
the site, and various other information such as section data etc. and will
be represented by CSiteEntry class. Methods provided are:
    CString GetURL( );
        Returns the base URL of the site.
    CString GetUsername( );
        Returns the username for the site.
    CString GetPassword( );
        Returns the password for the site.
    CString GetTitle( );
        Returns the password for the site.
    CString GetTitle( );
        Returns the title of the news source.
    int SectionCount( );
        Returns
```

Appendix 3B

TREE MANAGER MODULE

```
Tree Manager will maintain the most central data structure in this
program, which is a tree of Web page nodes and is represented by the
CPageTree. CPageTree will traverse the WWW to retrieve the necessary
Web pages according to the extraction specificatioin and builds the tree.
The methods provided are:
    CPageTreeNode* GetRoot( );
        Returns the root node of the tree.
    BOOL Build(CURL URL, CExtractionSpec& spec);
        Builds the tree according to the personal news profile
        extraction specification.
Each node in the page tree is represented by a CPageTreeNode.
Methods provided are:
    BOOL AddChild(CWebPage* page);
        Adds a child node with Web page data.
    CWebPage* GetPage( );
        Returns the Web page contained in the node.
    int NumberOfChildren( );
        Returns the number of children belonging to the node.
    BOOL IsLeaf( );
        Returns TRUE if a leaf node, i.e., no children.
To traverse the Web page tree, a CTreeIterator class is defined with
different traversal methods. Methods provided are:
    void Reset( );
        Cancels the current transferral, and initializes state data.
    CPage TreeNode* GetNextNode( );
        Returns the next node in the tree in a depth first search.
    CPage TreeNode* GetNextSibling( );
        Returns the next node in the tree in a breadth first search.
    CPage TreeNode* GetNextLeaf( );
        Returns the next leaf in the tree in a depth first search.
THE FORMATTER MODULE Input to this module will be the Web page tree created by the Tree
Manager and the output specification contained in the user profile.
Formatter will traverse the tree according to the rules specified in the
output specification and the final document will be formatted using the
formatting instructions in the output specification and the formatting
contained in the Web pages such as headings, paragraphs and lists etc.
The output document will be in Rich Text Format (RTF) and will be
accessible by many applications. RTF is a advanced formatting language
for text, providing document, section and paragraph formatting, style
sheets, headers and footers, and with support for Uniconde. Image
formats supported are DIB, DDB, WMF, OS/2 metafiles. There is no
support for Web images which are of the GIF format. A third party
library will need to be purchased in order to do the conversion of the GIF
to DIB format or one can be developed in-house.
The prototype creates a HTML file as the output.
The formatter is represented by the CFormatter class. The methods
provided are:
    BOOL OpenHTMLFile(CString fileName);
        Opens the named HTML file for output.
    void CloseHTMLFile( );
        Closes and saves the HTML file.
    BOOL PrintHTML(CPageTree& root, COutputSpec& format);
        Given the root and the output specification, traverses the
        tree and prints the contents in the Web pages in HTML
        format.
    BOOL OpenRTFFile(CString fileName);
        Opens the named RTF file for output.
```

APPENDIX 3-continued

```
void CloseRTFFile( );
    Closes and saves the RTF file.
BOOL PrintRTF(CPageTree& root, COutputSpec& format);
    Given the root and the output specification, traverses the
    tree and prints the contents in the Web pages in RTF format.
BOOL Print(CPageTree& root, COutputSpec& format);
    Given the root and the output specification at, traverses the
    tree and prints the contents in the Web pages to the default
    printer.
```

What is claimed is:

1. An automated method for formatting data into a personalized newspaper from at least one hypermedia document, comprising the steps of:

an accessing step to access the at least one hypermedia document;

a traversing step to traverse selectively links in the hypermedia document;

a retrieving step to retrieve data from the hypermedia document and/or traversed links into an extracted data tree, wherein the data is retrieved based on a structure of the hypermedia document and/or links in the hypermedia document;

a flattening step to flatten the extracted data tree into a linear document; and a formatting step to format the linear document into a formatted personalized newspaper consisting of text and/or images, wherein a number of links traversed in the traversing step can be limited to a predefined number of links.

2. The method of claim 1, further comprising the step of printing the formatted document.

3. The method of claim 1, wherein said hypermedia document is located on the World Wide Web.

4. The method of claim 1, wherein said hypermedia document is located on the Internet.

5. The method of claim 1, wherein said hypermedia document is located on an intranet.

6. The method of claim 1, wherein said accessing step, said retrieving step, said flattening step, and said formatting step are performed in accordance with a personal-news-profile.

7. An automated method for retrieving articles from a hypermedia-linked computer network and for formatting the articles into a personalized newspaper, the method comprising the steps of:

retrieving a stored personal-news-profile which comprises address data for a site on the hypermedia-linked computer network, command data for accessing data from the site, and newspaper layout commands;

contacting the site based on address data stored in the personal-news-profile;

traversing selectively links in the site;

downloading articles from the site and/or links in the site based on command data stored in the personal-news-profile;

flattening the articles into a linear document; and formatting the linear document into the personalized newspaper according to layout commands stored in the personal-news-profile, the personalized newspaper consisting of text and/or images, wherein a number of links traversed in the traversing step can be limited to a predefined numbers of links based on command data in the personal-news-profile.

8. The method of claim 7, further comprising the step of printing the personalized newspaper.

9. The method of claim 7, wherein said hypermedia-linked computer network is the World Wide Web.

10. The method of claim 7, wherein said hypermedia-linked computer network is on the Internet.

11. The method of claim 7, wherein said hypermedia-linked computer network is on an intranet.

12. The method of claim 7, wherein the command data for accessing data includes data for selecting articles based on a structure of the site.

13. The method of claim 12, wherein the command data for accessing data also includes data for selecting articles based on a content of the articles.

14. Computer executable process steps stored on a computer-readable medium, said steps for accessing World Wide Web sites for retrieving data at the sites and for formatting the data into a personalized newspaper, said steps comprising:

a connecting step to connect to the World Wide Web;

a retrieving step to retrieve user-defined Web site address information, user-defined Web site commands, and user-defined formatting commands;

an activating step to activate a Web reader so as to access a Web site based on the user-defined Web site address information, a traversing step for traversing selectively links in the Web site, and retrieving data from within the Web site and/or links based on the user-defined Web site commands;

a downloading step to download the retrieved Web site data and/or link data from the accessed Web site into an extracted data tree;

a flattening step to flatten the extracted data tree into a linear document;

a step to repeat the downloading step and the flattening step until all addresses/links in the user-defined Web site address information have been accessed; and a formatting step to format the stored data into the personalized document based on the user-defined formatting commands, said personalized document consisting of text and/or images, wherein a number of links traversed in the Web site can be limited to a predefined number of links based on the user-defined Web site commands.

15. The computer executable process steps of claim 14, further comprising a spooling step to spool the personalized document to an output device.

16. The computer executable process steps of claim 15, wherein the output device is a printer.

17. The computer executable process steps of claim 15, further comprising an output step to output the personalized document to a display.

18. The computer executable process steps of claim 14, wherein the user-defined Web site commands include commands for selecting data based on a structure of the Web site.

19. The computer executable process steps of claim 18, wherein the user-defined Web site commands also include commands for selecting data based on a content of the Web site.

20. An apparatus for automatically retrieving news articles from on-line news services on the World Wide Web and formatting the news articles into a personalized newspaper, the apparatus comprising:

first storage means for storing (1) a personal-news-profile which comprises address data and command data for accessing data from a Web site, and (2) newspaper format commands;

retrieval means for retrieving the stored personal-news-profile and accessing data stored therein;

activating means for activating a Web reader to contact a Web site based on address data stored in the personal-news-profile;

traversing means for traversing selectively links in the Web site;

downloading means for downloading news articles from the contacted Web site and/or links based on command data stored in the personal-news-profile;

second storage means for storing the downloaded news articles; and formatting means for flattening the downloaded news articles into a linear document and for formatting the linear document into the personalized newspaper based on the newspaper format commands stored in the personal-news-profile, said personal newspaper consisting of text and/or images, wherein a number of links traversed by the traversing means can be limited to a predefined number of links based on command data stored in the personal-news-profile.

21. The apparatus of claim 20, further comprising spooling means for spooling the personalized newspaper to a printer.

* * * * *